United States Patent [19]
Kurokawa

[11] Patent Number: 5,471,536
[45] Date of Patent: Nov. 28, 1995

[54] FIGURE DIGITIZING SYSTEM

[75] Inventor: Yuji Kurokawa, Nagoya, Japan

[73] Assignee: Brother Kogyo Kabushiki Kaisha, Nagoya, Japan

[21] Appl. No.: 69,861

[22] Filed: Jun. 1, 1993

[30] Foreign Application Priority Data

Aug. 20, 1992 [JP] Japan .................................. 4-245650

[51] Int. Cl.⁶ .................................................. G06K 9/22
[52] U.S. Cl. ............................................................ 382/315
[58] Field of Search ................................. 382/58–60, 62, 382/68; 364/474.24; 345/157, 165

[56] References Cited

U.S. PATENT DOCUMENTS

| | | | |
|---|---|---|---|
| 4,794,384 | 12/1988 | Jackson | 345/157 |
| 5,138,557 | 8/1992 | Seki et al. | 364/474.24 |
| 5,185,855 | 2/1993 | Kato et al. | 364/474.24 |
| 5,278,922 | 1/1994 | Takasaki et al. | 392/60 |
| 5,287,105 | 2/1994 | Schlotterbeck et al. | 345/157 |

Primary Examiner—Joseph Mancuso
Assistant Examiner—Gerard Del Rosso
Attorney, Agent, or Firm—Oliff & Berridge

[57] ABSTRACT

A figure digitizing system is described which reduces the operator's labor and enables even unskilled operators to digitize figures easily and accurately. The operator places a drawing to be read on an image information reader and points to characteristic points of the drawing by means of a cursor equipped with an image reader. A CPU operates in accordance with a program loaded from an external memory unit to determine the coordinates of the characteristic points and to display marks of the characteristic points on a display unit. The operator enters the drawing into the system while viewing the marks of characteristic points displayed on the display unit.

17 Claims, 26 Drawing Sheets

Fig.5 (a)

| POINT TYPE(1) | DE-LIMITE(2) | X-COORDINATE(3) | DE-LIMITER(2) | Y-COORDINATE(4) | DE-LIMITER(2) | IMAGE INFORMA-TION(5) |
|---|---|---|---|---|---|---|
| C1 | C1 | C7 | C1 | C7 | C1 | B |

C1 : 1 BYTE CHARACTER
C7 : 7 BYTE CHARACTERS
B : BINARY DATA STRING

Fig.5 (b)

| No. | ITEM | EXPLANATION |
|---|---|---|
| 1 | POINT TYPE | 'A' : CORNER POINT INPUT KEY<br>'B' : CURVE POINT INPUT KEY<br>'C' : END POINT INPUT KEY<br>'D' : FIGURE END KEY<br>'E' : END KEY |
| 2 | DELIMITER | ',' : (COMMA) |
| 3 | X-COORDINATE | THE NUMBER OF 7 DIGITS (JIS CORD)<br>UNIT : 1/10 mm<br>DISTANCE IN THE LATERAL DIRECTION FROM THE ORIGIN OF DIGITIZING BOARD |
| 4 | Y-COORDINATE | THE NUMBER OF 7 DIGITS (JIS CORD)<br>UNIT : 1/10 mm<br>DISTANCE IN THE VERTICAL DIRECTION FROM THE ORIGIN OF DIGITIZING BOARD |
| 5 | IMAGE INFORMATION | BINARY DATA OF IMAGE |

Fig.6(b)

| ITEM | INSTRUCTIONS |
|---|---|
| S1 | KEY INPUT |
| S2 | INPUT KEY PRESSED ? |
| S3 | CALCULATE COORDINATES OF INPUT POINT |
| S4 | READ IMAGE |
| S5 | PRODUCE IMAGE INFORMATION |
| S6 | CORNER POINT ENTERED ? |
| S7 | CURVE POINT ENTERED ? |
| S8 | END POINT ENTERED ? |
| S9 | FIGURE END ? |
| S10 | END ? |
| S11 | CALCULATE CORNER POINT POSITION |
| S12 | CALCULATE CURVE POINT POSITION |
| S13 | STORE CHARACTERISTIC POINT COORDINATES AND DISPLAY THEIR MARKS |
| S14 | COMPLETION OF INPUT OF ONE FIGURE |
| S15 | CALCULATE END POINT POSITION |
| S16 | SAVE VECTOR DATA IN EXTERNAL MEMORY |

FIGURE DIGITIZING SYSTEM

BACKGROUND OF THE INVENTION

1. Field of the Invention

The invention relates to a figure digitizing system.

2. Description of the Related Art

Computer-Aided Design (CAD) systems which draw and manage graphic figures under computer control are becoming more and more popular. Thus, figure digitizers are needed as input means for these CAD systems.

A generally known figure digitizing system is designed such that the operator traces a figure drawn on a drawing with an image reading cursor and presses a key provided on the image reading cursor at the intended position of the figure. The system recognizes and records the coordinates of the cursor position.

However, this general digitizing system requires the operator to accurately set the cursor position on the intended point. Therefore, a significant amount of physical and mental effort is required by the operator during the image input operation. In addition, the accuracy of the input data varies greatly depending on the degree of proficiency of each operator. This causes various problems when the CAD system uses the input data.

Another known figure digitizing system comprises an image scanner, a display unit which displays the image data produced by the image scanner, and a mouse device used to point to an arbitrary position of the displayed image. In operation, the system displays candidate digitizing points on a displayed line of the image, and the operator selects a point with the mouse. The position of the selected point is then digitized and stored.

This figure digitizing system reads the entire drawing to enter a figure. Therefore, this system requires a large image scanner, which results in an expensive, large-scale system. In addition, a long time is needed read a large, intricate drawing. Further, a large memory capacity is needed to store the input image data.

A known automatic figure digitizing system, which is intended to relieve the operator's labor, is designed to read the entire drawing with a scanner, analyze the generated image data, automatically extract all characteristic points of the figures included in the drawing, and calculate the coordinates of the points of the drawing figures.

This automatic figure digitizing system suffers from degraded reliability and accuracy of the input data when the points and lines drawn on the drawing are not clear. Handwritten figures are particularly prone to this problem.

Because of these problems, an operator expends a significant amount of time and labor when entering the drawings which become source data for the system. In order to effectively use the vast amount of existing drawings, CAD operators desire a drawing input means which is both easy to operate and accurate enough to efficiently transform drawings figures into electronic data usable as source CAD data.

SUMMARY OF THE INVENTION

The invention overcomes the foregoing deficiencies in known figure digitizing systems. This invention primarily provides a figure digitizing system which is easy to operate and capable of digitizing figures at a virtually constant accuracy whether operated by either skilled or unskilled operators.

This invention achieves this objective by providing a figure digitizing system comprising, as shown in FIG. 1, a pointing means 1 for specifying a characteristic point of a character or figure, a reading means 2 for reading image information at positions near the characteristic point specified by the pointing means, a read position determining means 3 which determines coordinates of the positions of the image information provided by the reading means 2, and a characteristic point coordinate determining means 4 which determines the coordinates of the characteristic point specified by the pointing means 1 based on the positions of the image information determined by the read position determining means 3.

In operation, the pointing means 1 points to a characteristic point of a character or figure, and the reading means 2 reads image information at positions near the characteristic point. The read point determining means 3 determines the positions of the image information, and the characteristic point coordinate determining means 4 determines the coordinates of the characteristic point specified by the pointing means 1.

BRIEF DESCRIPTION OF THE DRAWINGS

FIGS. 5(a) and 5(b) are tables showing the structure of the image information including the data structure and the details of the data;

DESCRIPTION OF THE PREFERRED EMBODIMENT

A preferred embodiment of this invention will be described with reference to the drawings. The figure digitizing system of this preferred embodiment is used to enter the shape of dress patterns in dressmaking work.

Figure 1:
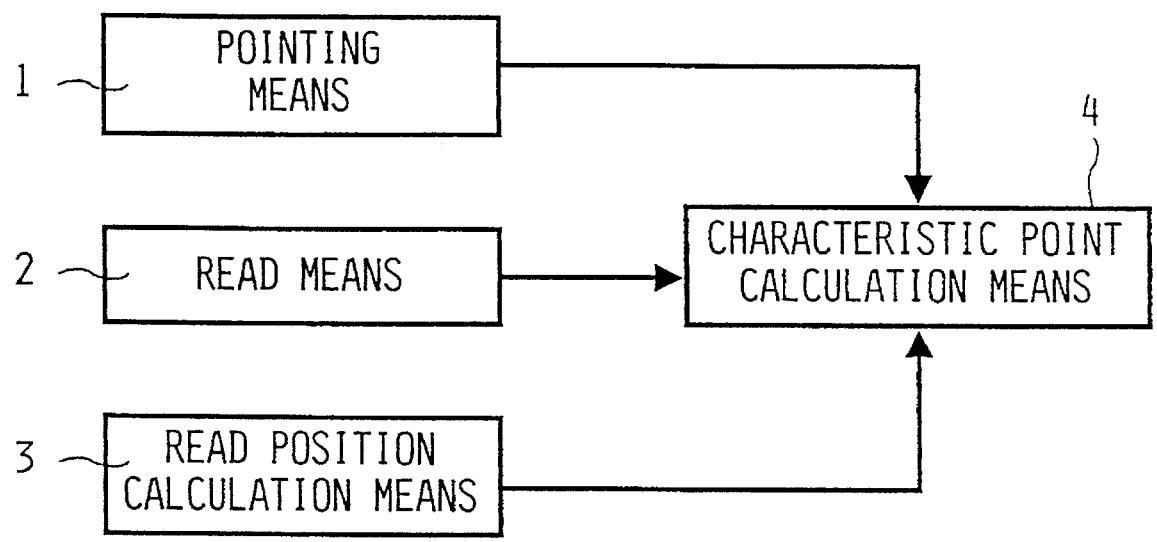
FIG. 1 is a block diagram of a system configuration according to this invention.
Figure 2:
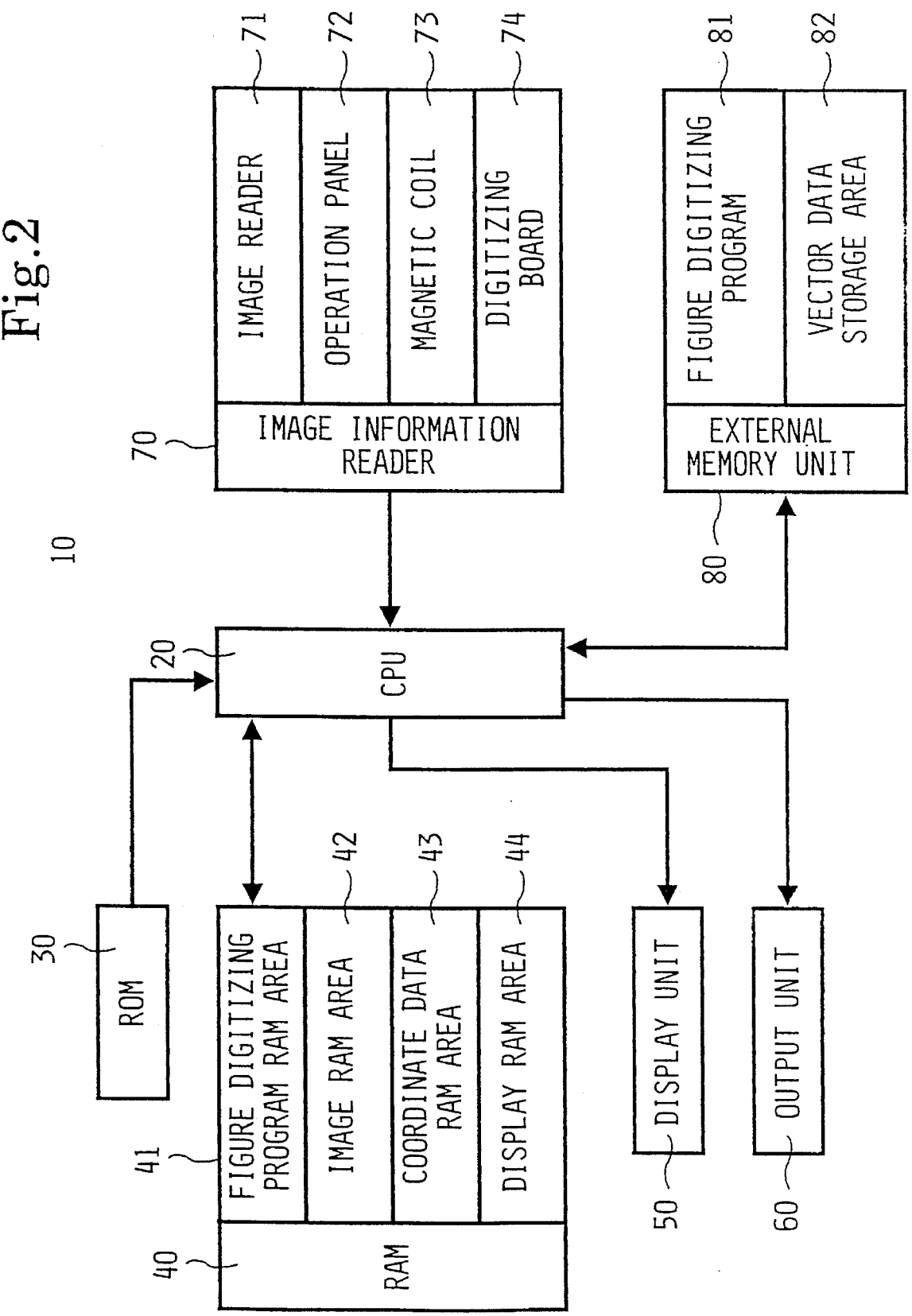
FIG. 2 is a block diagram of the basic arrangement of a figure digitizing system in a preferred embodiment according to this invention.

In FIG. 2, which shows the basic arrangement of this preferred embodiment, the figure digitizing system 10 is made up of a CPU 20 which controls the overall system, a ROM 30 which stores the operational programs, a RAM 40 which holds the image data and a current operational program, a display unit 50, such as a CRT unit, for displaying images and messages, an output unit 60, such as an XY plotter or printer, for printing images and other data, an image information reader 70 which reads image information located at the position specified by the operator, and an external memory unit 80, such as a hard disk memory, for reading and writing stored information.

The external memory unit 80 has a storage area 81 for storing a figure digitizing program which is executed during the operation of the system 10. The external memory unit 80 also has a storage area 82 for storing image vector data. The operational programs stored in the ROM 30 include a bootstrap program which is initiated immediately after the system 10 is turned on. The boot-strap program initializes the system 10. The RAM 40 is divided into a first area 41 for storing the figure digitizing program 81 transferred from the external memory unit 80, a second 42 for holding image data provided by the image information reader 70, a third area 43 for holding image coordinate data of positions specified by the operator, and a fourth area 44 for holding image data to be displayed on the display unit 50.

The image information reader 70 is made up of an image reader 71, an operation panel 72, a magnetic coil 73 for detecting the position specified by the operator, and a digitizing board 74 on which is placed the object drawing to be read. The image reader 71 includes a charge-coupled device (CCD) array for generating image data signals from the drawing. The operator uses the operation panel 72 to point to the position of an intended characteristic point and to specify the type of the intended characteristic point. The characteristic point is defined here to be a point which is indispensable for the representation of the shape of the figure. In the preferred embodiment, the characteristic point is categorized as either a corner point where two line segments connect, a curve point located on a curve segment, or an end point located at the end of a line segment.

Figure 3:
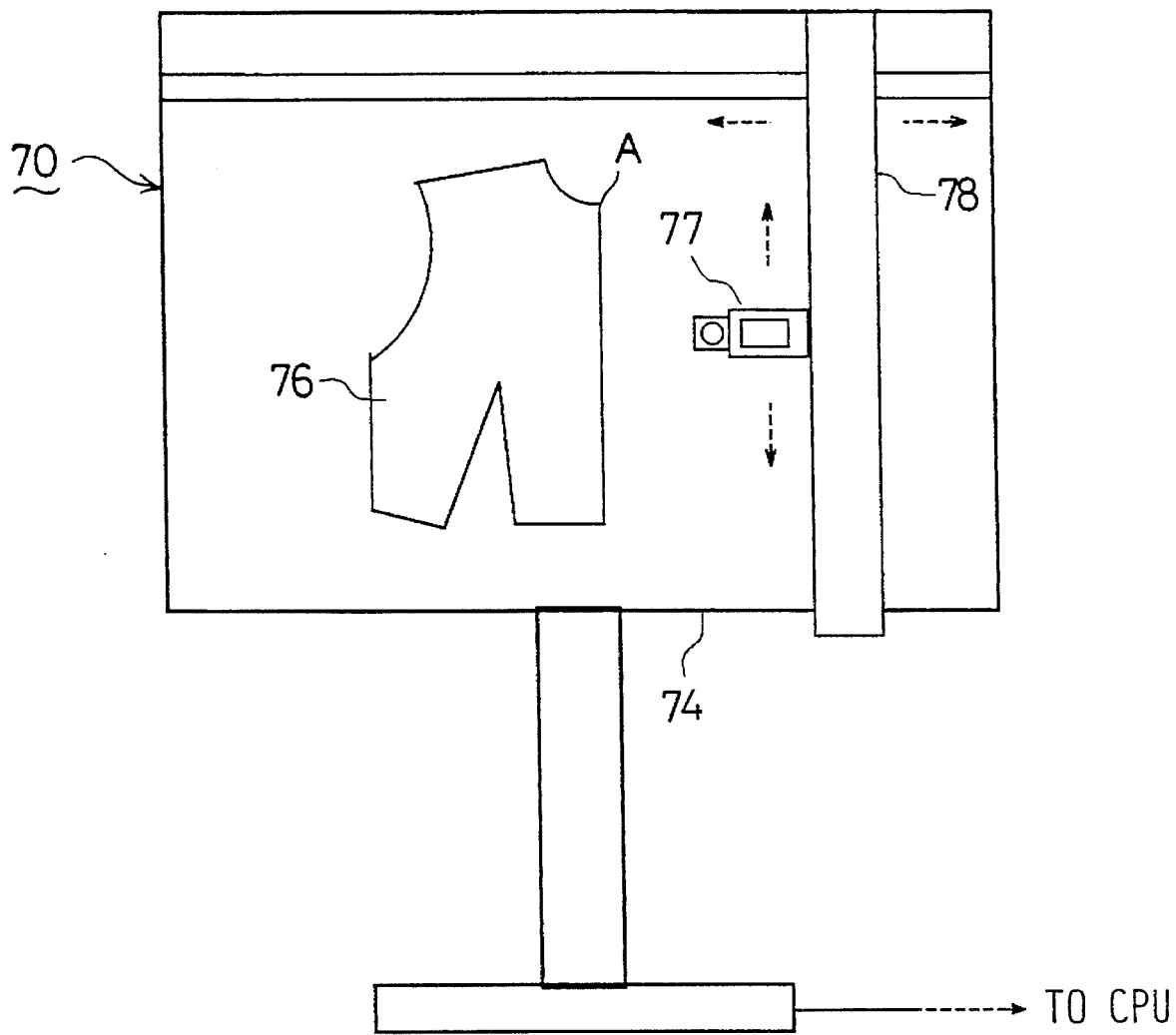
FIG. 3 is a front view of an image information reader of the figure digitizing system.

The image information reader 70 is explained in detail with reference to FIG. 3 and FIG. 4. FIG. 3 is a front view of the image information reader 70. A dress pattern 76 to be read is placed on the digitizing board 74. An image information reading cursor 77 is supported by a drafter mechanism 78. The image information reading cursor 77 is movable vertically relative to the drafter mechanism 78, and the drafter mechanism 78 is movable horizontally relative to the digitizing board 74.

Figure 4A:
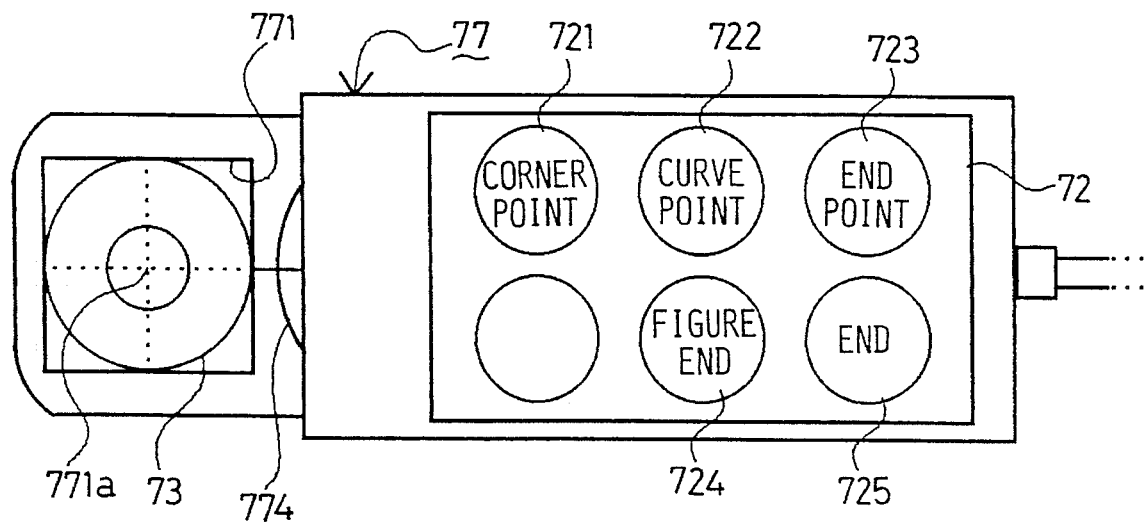
FIGS. 4(a) and 4(b) are a top view and a side view of the structure of an image reading cursor of the image information reader.
Figure 4B:
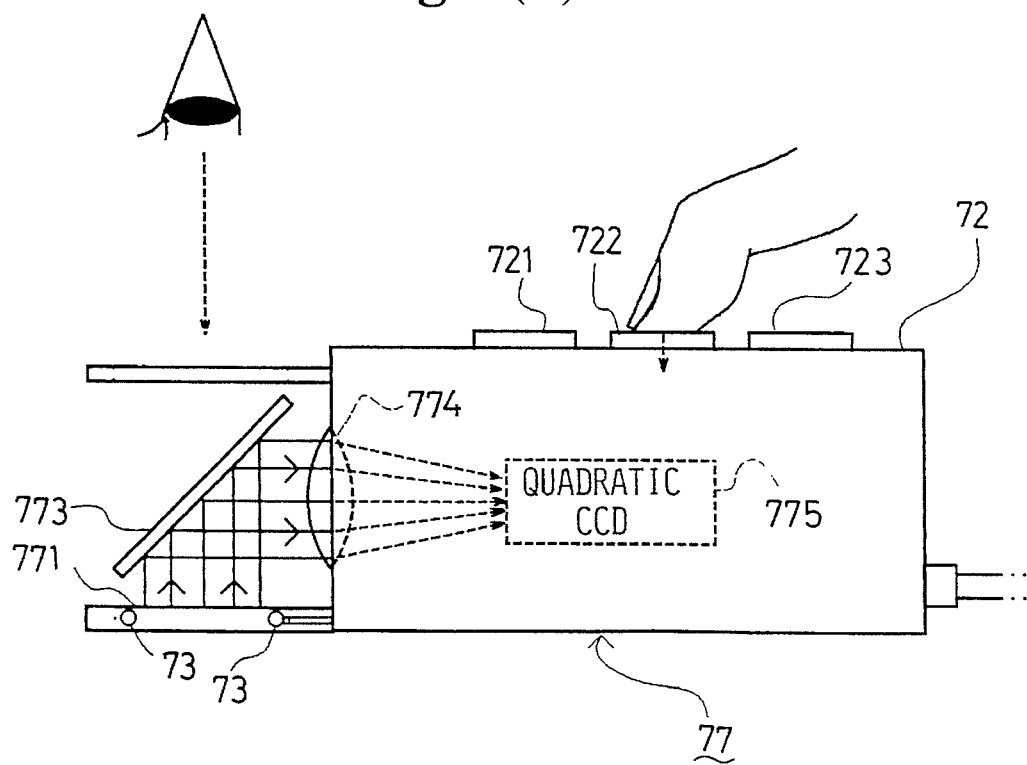

FIGS. 4(a) and 4(b) show in detail the structure of the image information reading cursor 77. The cursor 77 has an operation panel 72 on its top surface. The operation panel 72 includes a corner point input key 721, a curve point input key 722 and an end point input key 723. These keys are used to enter a characteristic point of the respective type. The operation panel 72 also includes a figure end key 724, which is used to indicate when entry of a figure is finished, and an end key 725, which is used to indicate the entire input operation is completed. The cursor 77 has at one end a window 771. A magnetic coil 73 is fitted in the window 771.

When any of the position input keys 721, 722 or 723 is pressed, a current is supplied sequentially to each wire of a wire mesh arrayed horizontally and vertically inside the digitizing board 74. The magnetic coil 73 senses the current. The accurate position 771a of the window 771 is determined from the detected position of the active wires. This operation is identical to the usual digitizer. The determined input position and the type of point are sent together with the image information (described below) to the CPU 20 by way of a communication means, such as a serial interface port.

The cursor 77 is further provided with optical devices including a half mirror 773 and lens 774. The image information located within the loop of the magnetic coil 73 is picked up and introduced into the cursor by being reflected from the half mirror 773 and focussed by the lens 774 onto a CCD 775 positioned in the cursor. The resulting image is input by the CCD 775 and converted to image data. This imaging mechanism is identical to that employed in existing compact CCD cameras. The image information, including the image data produced by the CCD 775 and the above-mentioned input point information, is sent to the CPU 20.

FIG. 5 shows an example of the content of the image information. The image information is a set of records. These records include the type of input characteristic point, the X coordinate and Y coordinate of the characteristic point image data, as shown by FIG. 5 (a), and details of the image data, as shown by FIG. 5(b).

Figure 6:
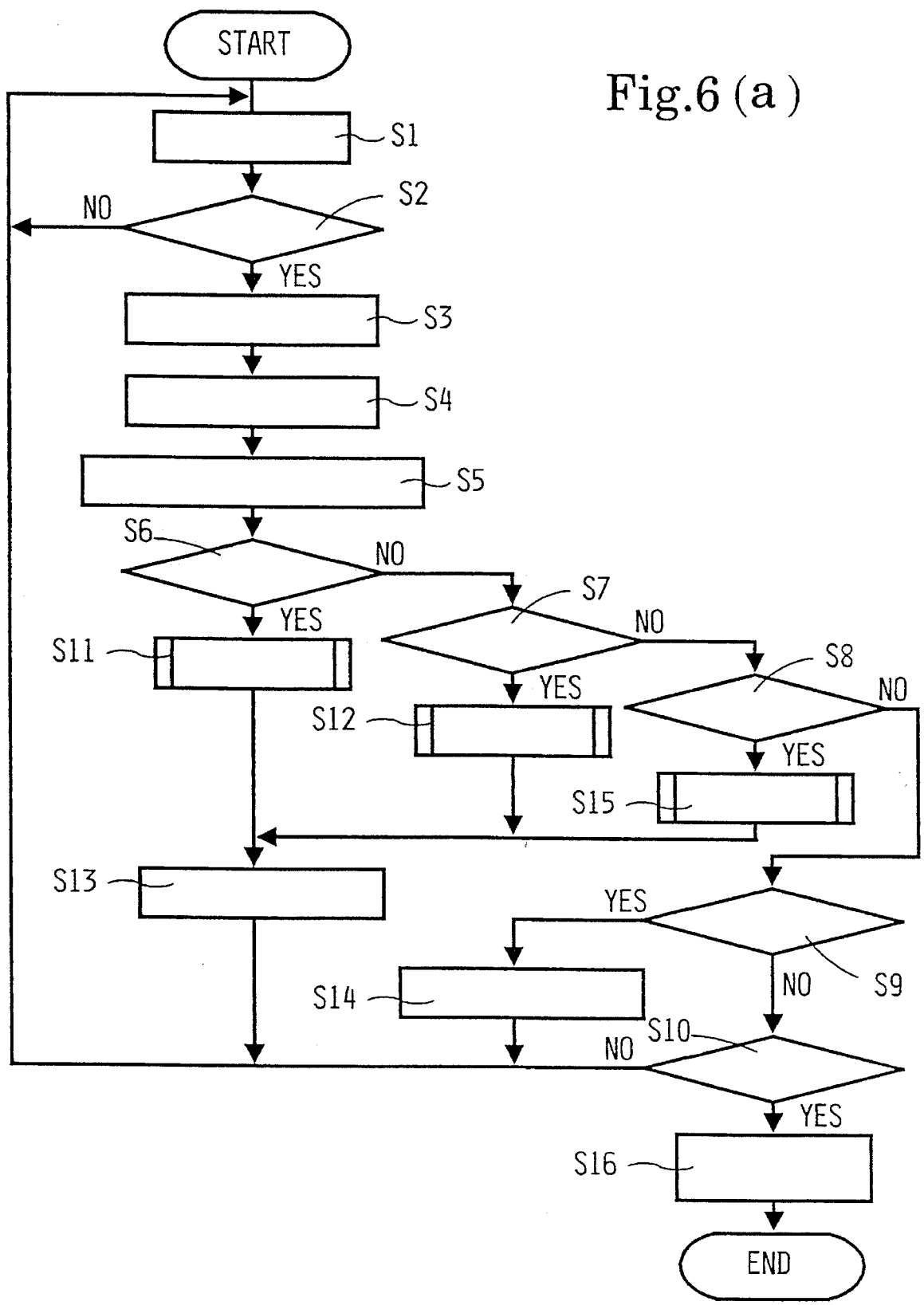
FIGS. 6(a) and 6(b) are a flowchart of the overall operational procedure of the figure digitizing system in this embodiment.

The figure digitizing operation based on the foregoing system configuration is explained in reference to the flowchart of FIG. 6. When the system 10 is turned on, the figure digitizing program 81 stored in the external memory unit 80 is loaded into the figure digitizing program area 41 of the RAM 40, and the system 10 is initiated. This program 81 fills the display RAM area 44 with menu data to display the operational menu on the screen of the display unit 50. The menu prompts the operator to take an input action (step S1).

The operator sets a dress pattern 76 on the digitizing board 74 as shown in FIG. 3, and then starts the figure input operation. The figure input operation is carried out by the operator through the entry of the positions and types of characteristic points on the dress pattern 76. For example, when the operator intends to enter a point A, i.e., the front neck point located at the top right corner of the pattern 76 of FIG. 3, the operator moves the image information reading cursor 77 to that position and presses the corner point input key 721.

In response to the key input (yes in step S2), the coordinates of the point at the center 771a of the cursor window 771 (hereinafter referred to as the "input point") are determined (step S3) and, at the same time, the image in the window 771 is read by the CCD 775 (step S4). The image information, including the type and coordinates of the input point and image data from the CCD 775 is produced (step S5), and sent to the CPU 20. If an input key is not pressed (no in step S2), the control sequence stays in the loop of S1 and S2 and the system waits for a key input.

The CPU 20 analyzes the received image information to recognize the type of input point (steps S6 to S10). Step S6 determines if the input key is the corner point key 721. Step S7 determines if the input key is the curve point key 722. The CPU 20 determines the coordinates of the corner point in step S11 (if step S6 is yes), or the curve point in step S12 (if step S7 is yes). The method for determining calculation of coordinates will be explained in detail later.

Figure 12:
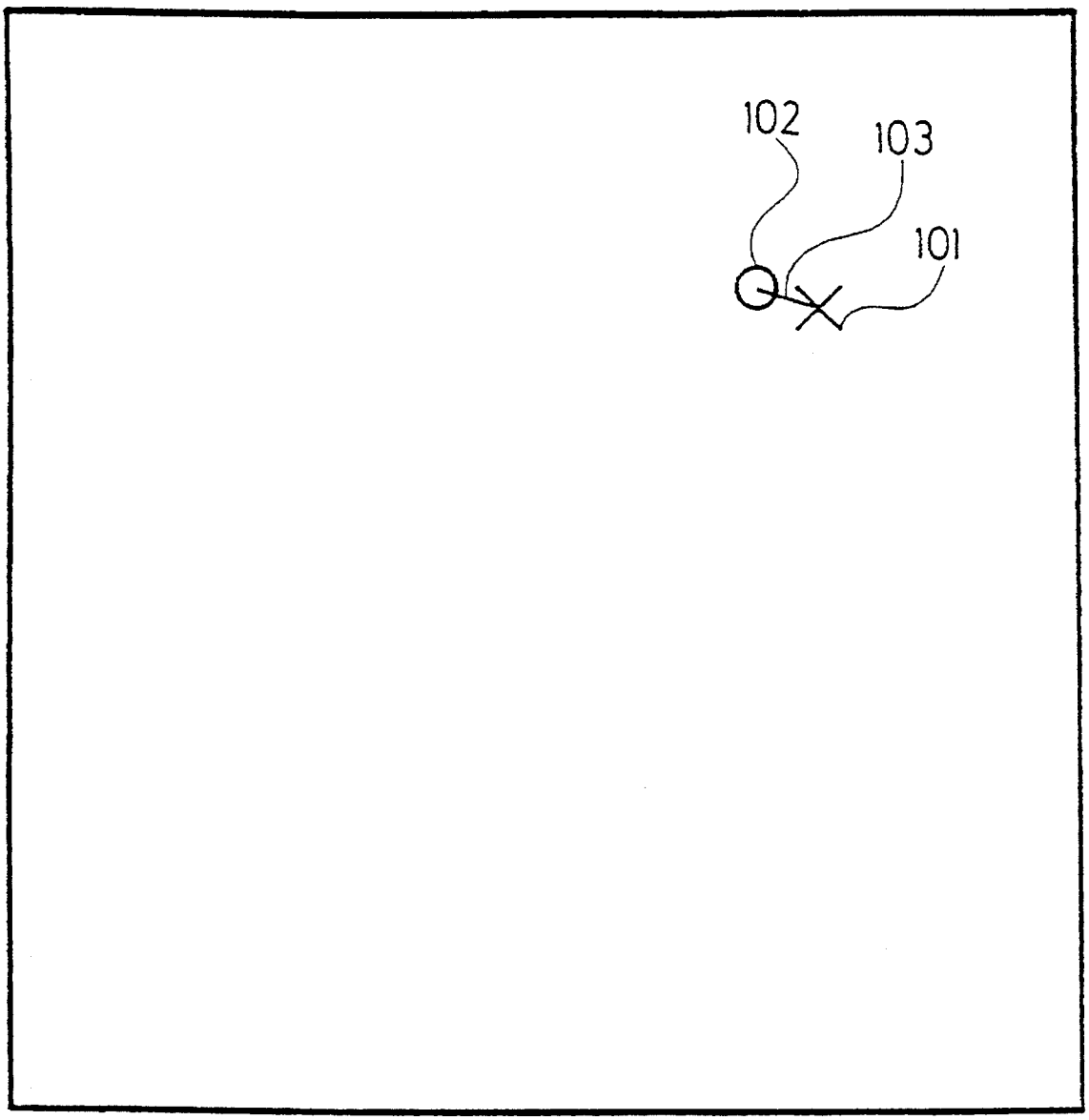
FIG. 12 shows an example of the display of a corner point and a curve: point as a result of the digitizing process.

The coordinates of the corner point or curve point determined in step S11 or S12 are stored in the coordinate data area 43 of the RAM 40 in step S13. As a result of the digitizing process, as shown in FIG. 12, the position of a corner point is indicated by a mark "x" 101 and a curve point is indicated by a mark "o" 102 on the screen of the display unit 50. A previously digitized point and a newly digitized point are connected with a configuration line 103.

In plotting a curve by starting from a corner point, when at least one curve point has previously been input between the start point and the newly input point, each configuration line connecting the cursor point and the newly plotted curve point is drawn through a plurality of interpolated points. The interpolated points are generated by the quadratic spline curve interpolation scheme, for example.

Figure 13:
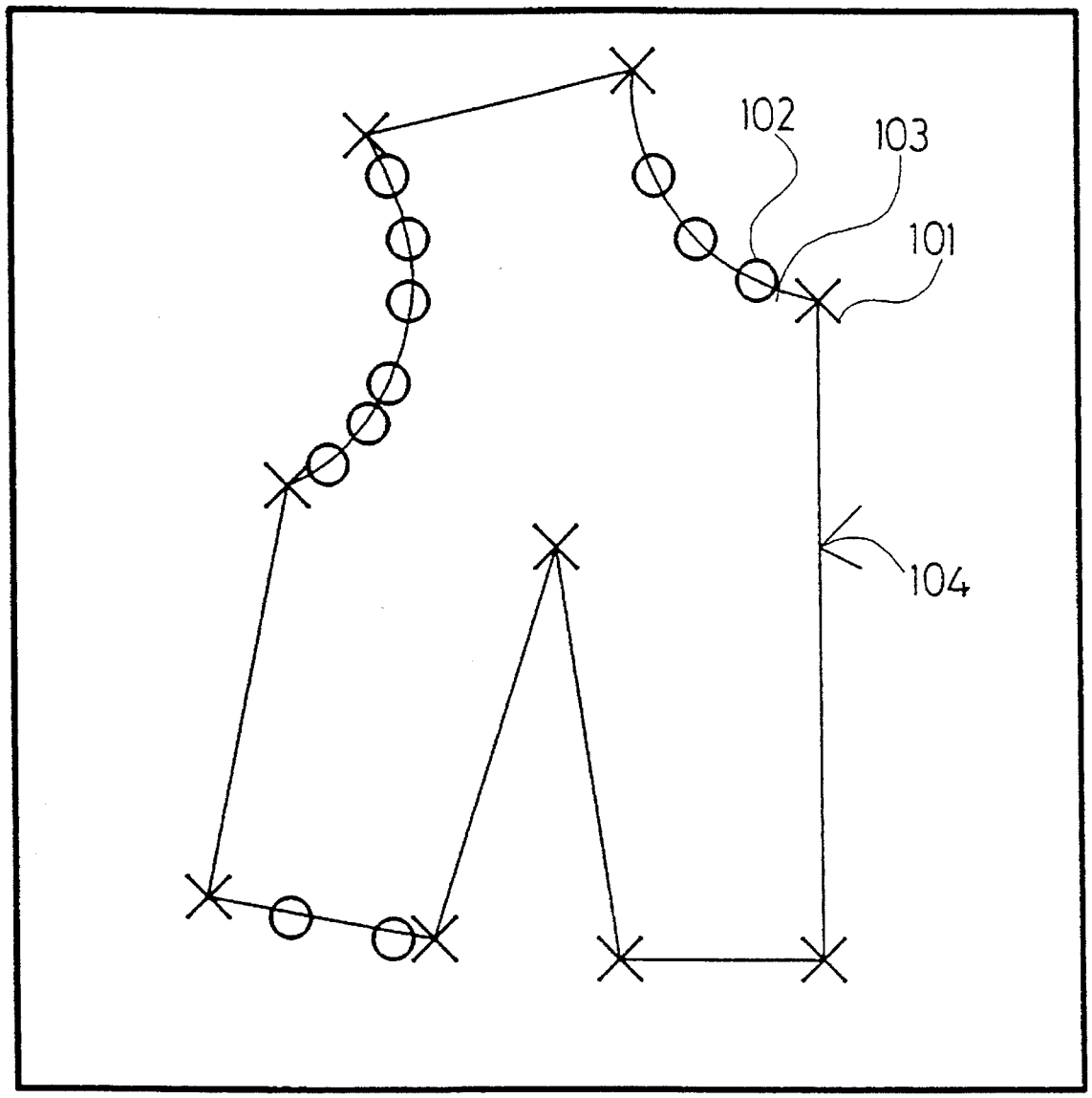
FIG. 13 shows an example of the display of the profile of a dress pattern as a result of the digitizing process.

The operator enters corner points and curve points as intended in the counterclockwise direction along the profile of the dress pattern FIG. 76. After entering the same point 101 which was entered as the first characteristic point, following a cycle as shown in FIG. 13, the operator presses the figure end key 724 to indicate one figure is completely entered. In response (yes in step S9), the system 10 recognizes a set of data of input points forming the profile of a dress pattern and stores information indicative of this recognition in the coordinate data area 43 of the RAM 40. Then, the entry of the figure or outline is completed (step S14).

Figure 15:
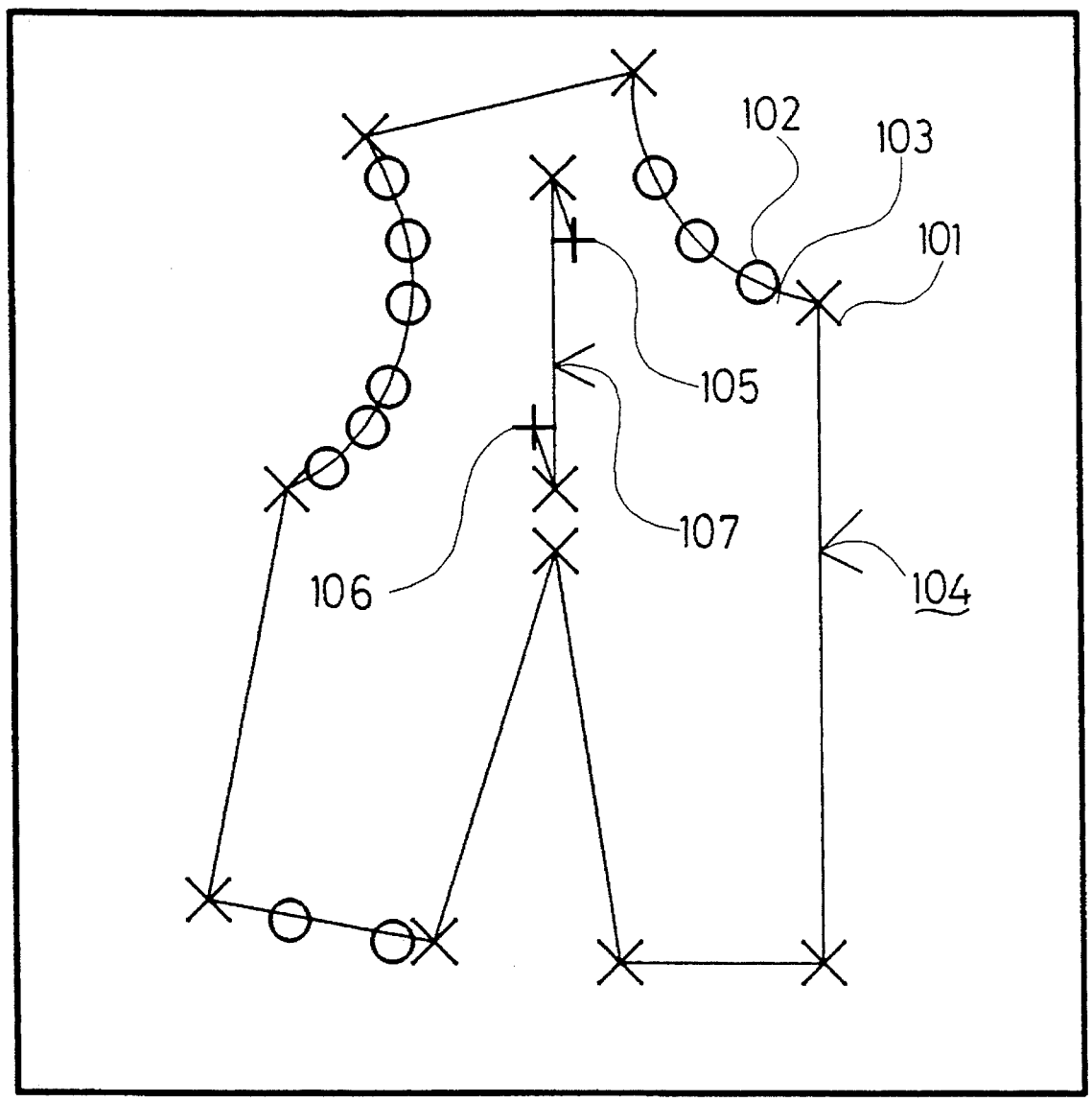
FIG. 15 shows an example of the display of the field line of the digitized dress pattern.

Next, the operator moves the image information reading cursor 77 to one end of a warp line 107, as shown in FIG. 15, located in the interior of profile of the dress pattern 76. The operator presses the end point input key 723 to digitize this end point. In response to this key input, image information is produced in the same manner as described above in steps S3–S5. This image information is sent from the image information reader 70 to the CPU 20. The CPU 20 determines if the input key is the end point key 723 (yes in step S8), and determines the coordinates of the point from the image information (step S15). The method for determining the end point will be explained later.

Figure 14:
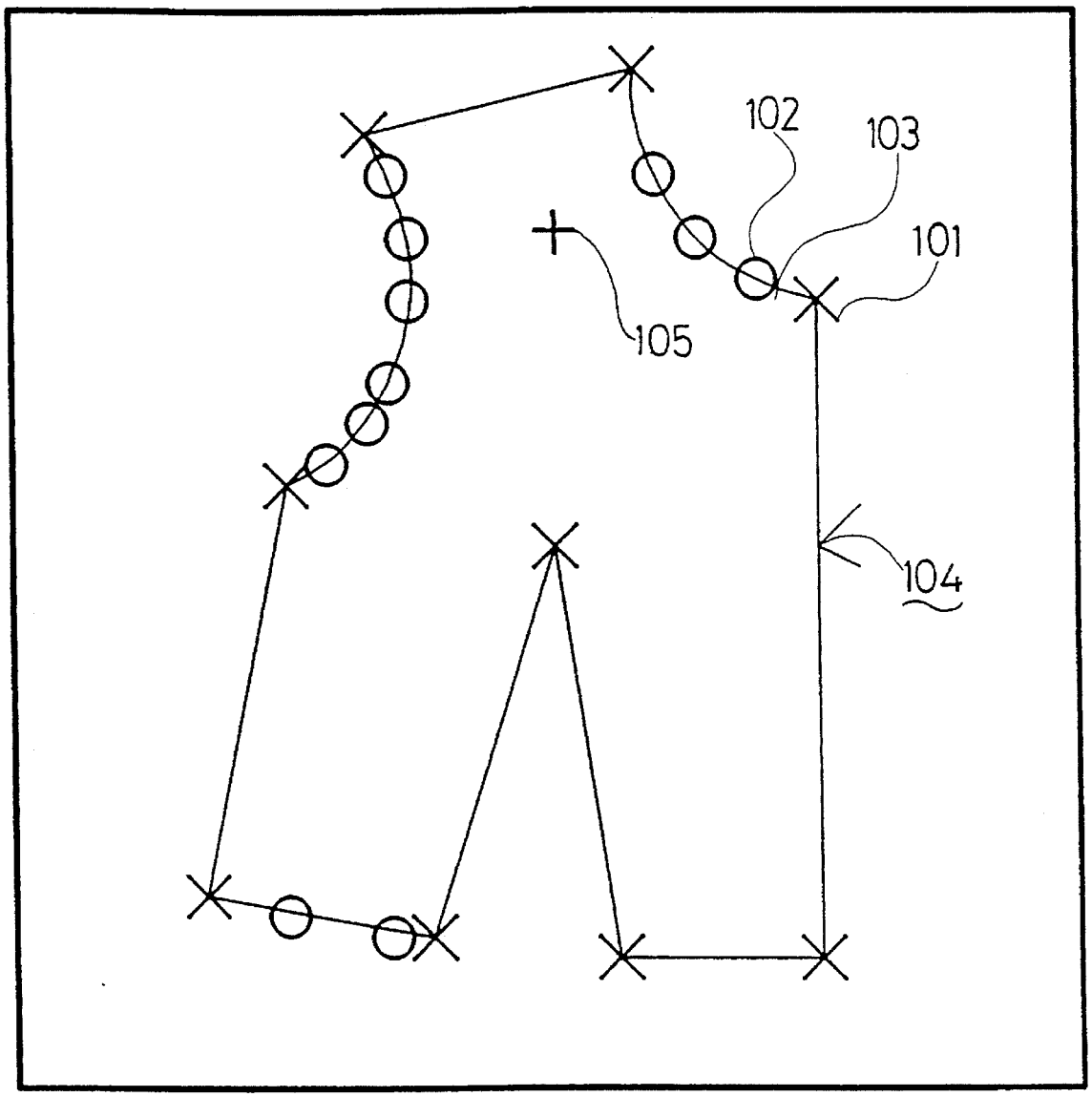
FIG. 14 shows an example of the display of the end point as a result of the digitizing process.

The coordinates of the end point determined in step S15 are stored in the coordinate data area 43 of the RAM 40 in the same manner as for the corner points and curve points. As a result of the digitizing process, the position of the end point is indicated by a mark "+" 105 on the screen of the display unit 50 as shown in FIG. 14 (step S13). The operator enters points as intended along the warp line 107 of the dress pattern 76. After entering another end point 106 of the warp line 107, as shown in FIG. 15, the operator again presses the figure end key 724. In response (yes in step S9) indicating entry of one warp line 107 is completed, the system 10 recognizes a set of data for a warp line 107, and again stores information indicative of this recognition in the coordinate data area 43 of the RAM (step S14).

After all the figures are digitized by following the foregoing procedure, the operator presses the end key 725 thereby to indicate the input operation is complete. In response (yes in step S10), the CPU 20 generates figure vector data in accordance with all of the coordinate values stored in the coordinate data area 43 and saves the data in the vector data area 82 of the external memory unit 80 (step S16), and the figure digitizing process completes.

Figure 7:
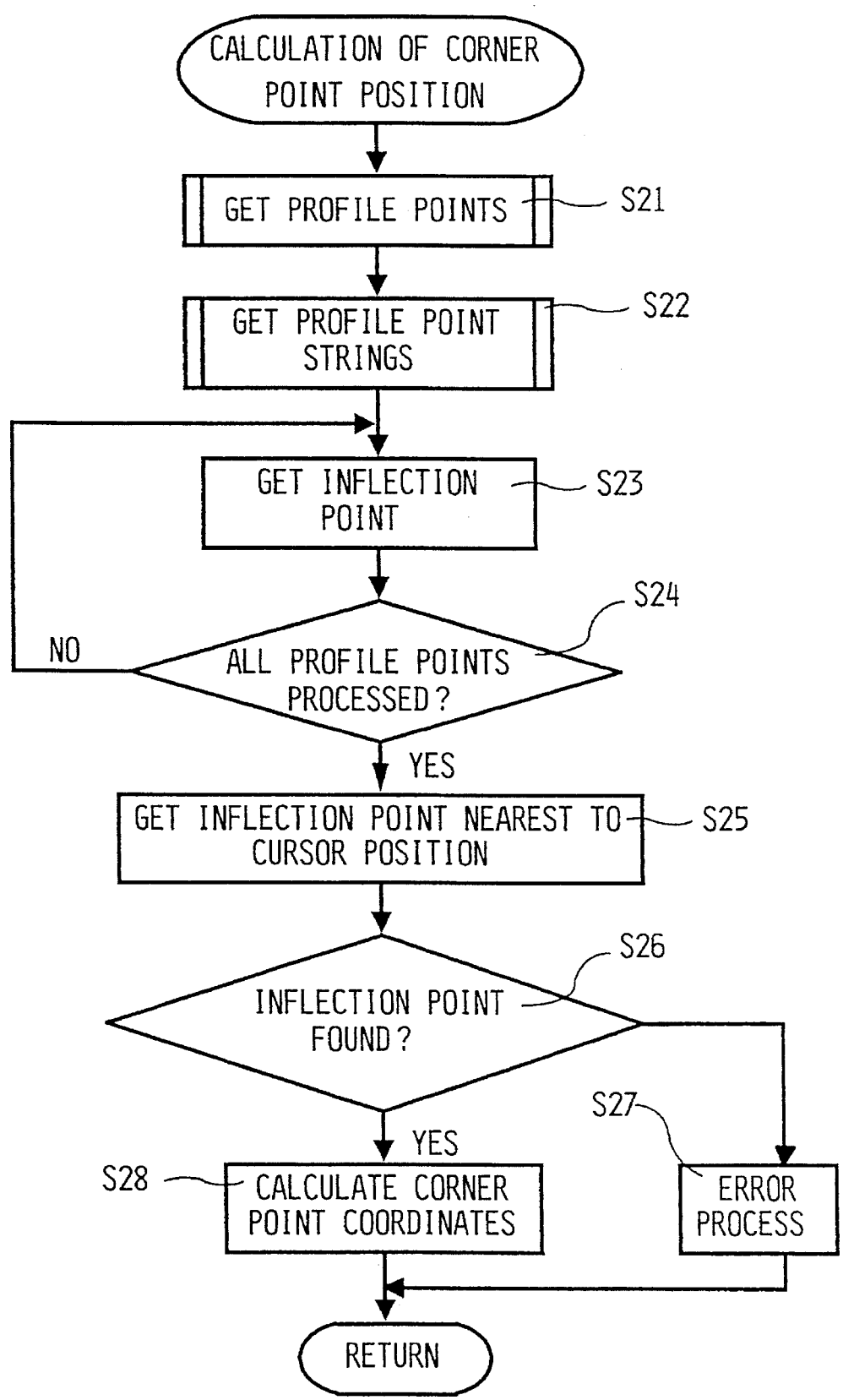
FIG. 7 is a flowchart of the procedure for determining the position of a corner point.
Figure 16:
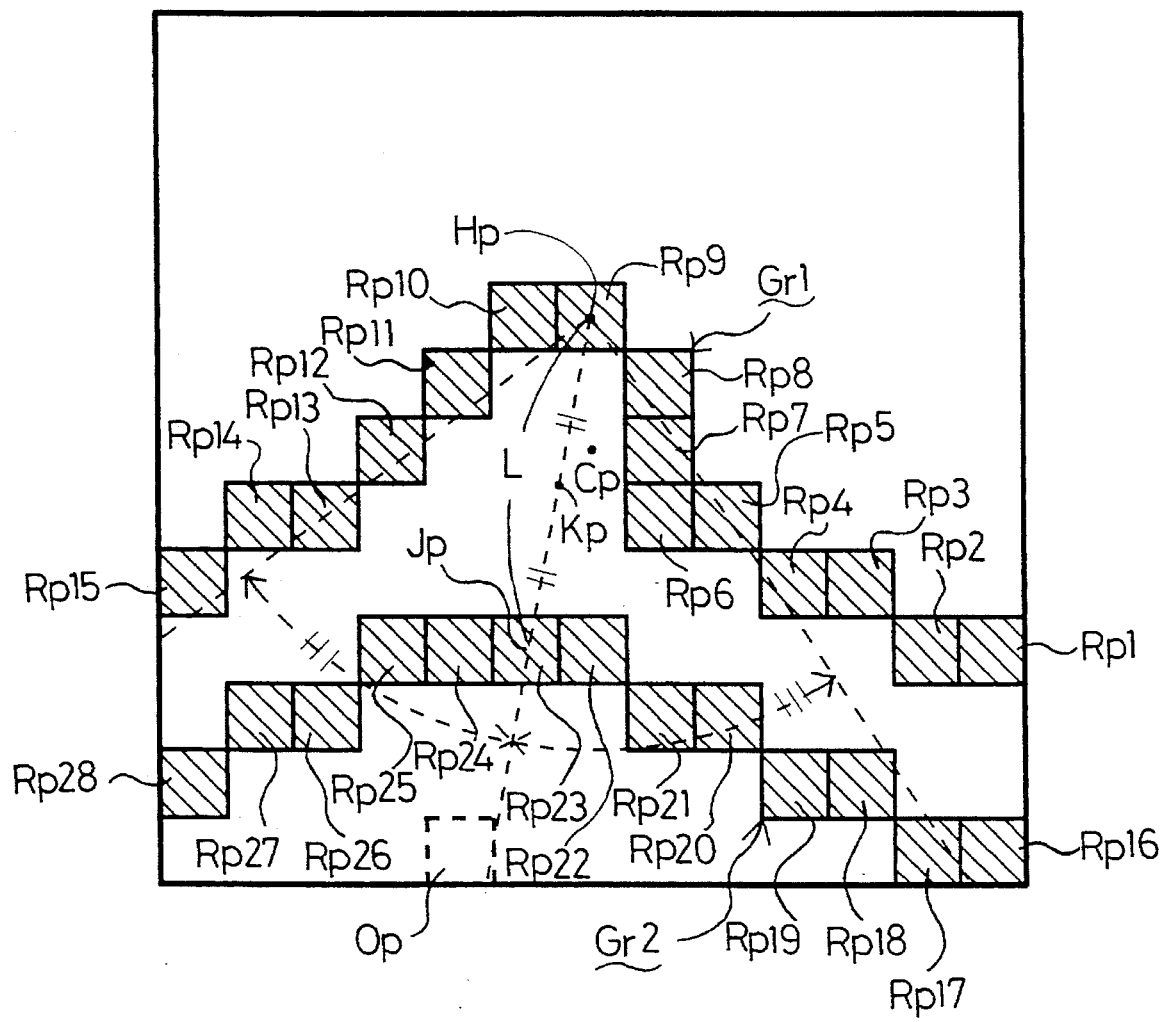
FIG. 16 is a model of the method for determining the position of a corner point.

The corner point determining process (step S11 of FIG. 6) will be explained in detail with reference to the flowchart of FIG. 7 and the diagram of FIG. 16. Initially, the profile points Rp1 through Rp28, are determined from the image information provided by the image information reader 70 (step S21). The image information is representative of a portion of the pattern 76 which is within the cursor window 771 when the corresponding characteristic point is entered by the operator. A profile point is a square pixel of the image portion, as shown in FIG. 16, with its position being represented by the central coordinates of the pixel. The method for detecting these profile points will be explained later. Strings of profile points are classified into groups. In FIG. 16, the strings Gr1 and Gr2 are formed from the profile points. The order of the profile points in each group is then determined (step S22).

After determining the profile point strings Gr1 and Gr2 and the order of profile points in each string, the inflection points of each profile point string are detected (step S23). An inflection point is a bend point of a profile point string. The method for detecting inflection points will be explained later. The inflection point detection process is continued until all profile points Rp1–Rp28 of all profile point string groups Gr1 and Gr2 have been examined (step S24). Once all of the inflection points have been identified by analyzing each profile point (yes in step S24), the inflection point Hp which is nearest to the input point 771a pointed to by the image reading cursor 77, i.e., the central point Cp of the image, is determined as the nearest inflection point (step S25). If a nearest inflection point does not exist (no in step S26), the control sequence proceeds to the error processing (step S27). If a nearest inflection point exists (yes in step S26) the coordinates of corner points are determined as follows (step S28).

Initially, an auxiliary point Jp is determined as the profile point (Rp23 in this example) which is both a part of the profile point string which does not include the nearest inflection point Hp (Gr2 in this example) and which is located on the bisector of the angle of the profile point string which includes the nearest inflection point Hp (Gr1 in this example) and which extends through the point Hp. The method for determining the angle of the profile point string at the point Hp will be explained later. If no profile point meets the conditions for the auxiliary point Jp, a point Op which is the intersection of the bisector of angle through the point Hp and the bottom boundary of the image portion is selected as the auxiliary point Jp. Next, the distance L between the auxiliary point Jp and the nearest inflection point Hp is determined. A point which is located on the line connecting the nearest inflection point Hp to the auxiliary point Jp and is L/2 from the point Hp is defined as the corner point Kp, and the coordinates of the points within the image portion "relative coordinates") are determined, Since the coordinates of the central point Cp on the digitizer coordinate system the "absolute coordinates" are already known from the image information when the characteristic point is pointed to by the image reading cursor 77 (see FIG. 5 and step S6 of FIG. 6), the absolute coordinates of the corner point Kp can readily be determined from the relative coordinates mentioned above. The coordinates of an intersection can also be determined in this manner.

Figure 8:
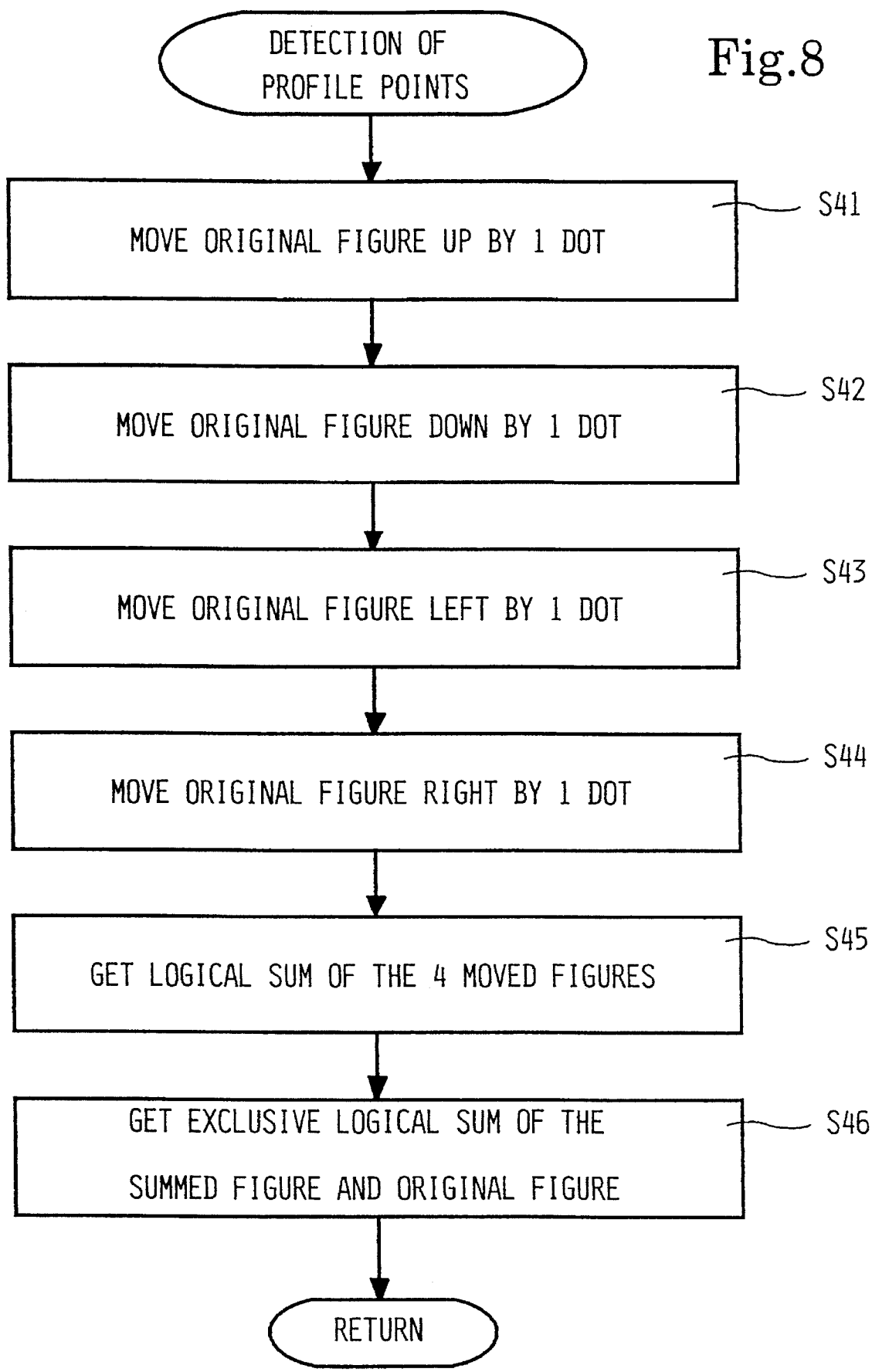
FIG. 8 is a flowchart of the procedure for detecting a profile point.
Figure 17:
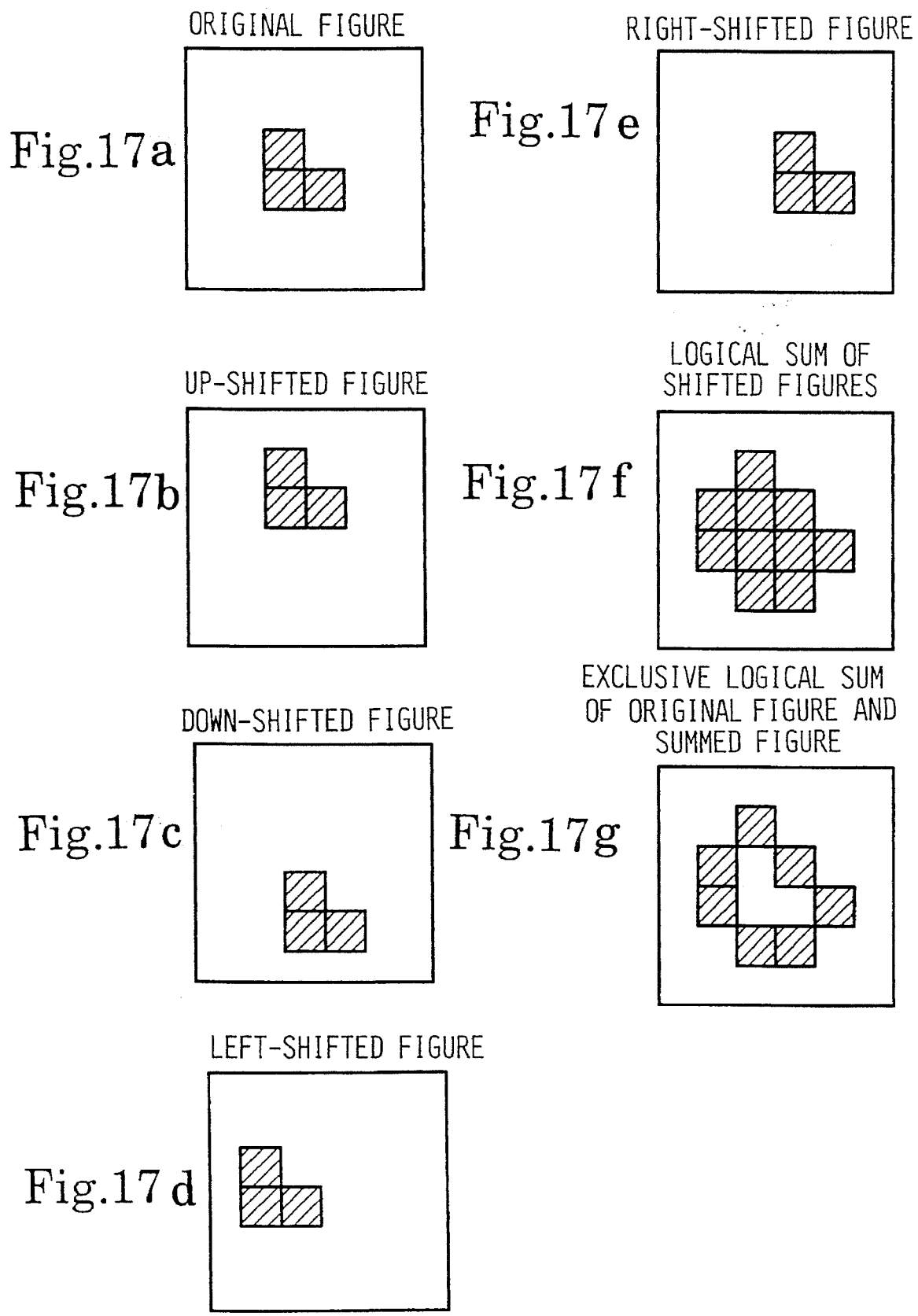
FIGS. 17(a)–17(g) are a model of the method for detecting profile points.

The profile point detecting process (step S21 in FIG. 7) will be explained with reference to the flowchart of FIG. 8 and the diagram of FIG. 17. It is assumed that an original figure, to produce image data as shown by FIG. 17(a), is read. The original figure is moved up by one dot (pixel) length to produce image data shown by (b) (step S41). Similarly, the original figure is moved down, left and right by one dot (pixel) length each to produce image data shown by FIGS. 17(c), 17(d) and 17(e) (steps S42, S43, S44). The resulting four sets of image data logically summed to generate the image data shown in FIG. 17(f) (step S45). The summed image data and the original image data are exclusively summed to produce the image data shown in FIG. 17(g) (step S46).

Figure 9:
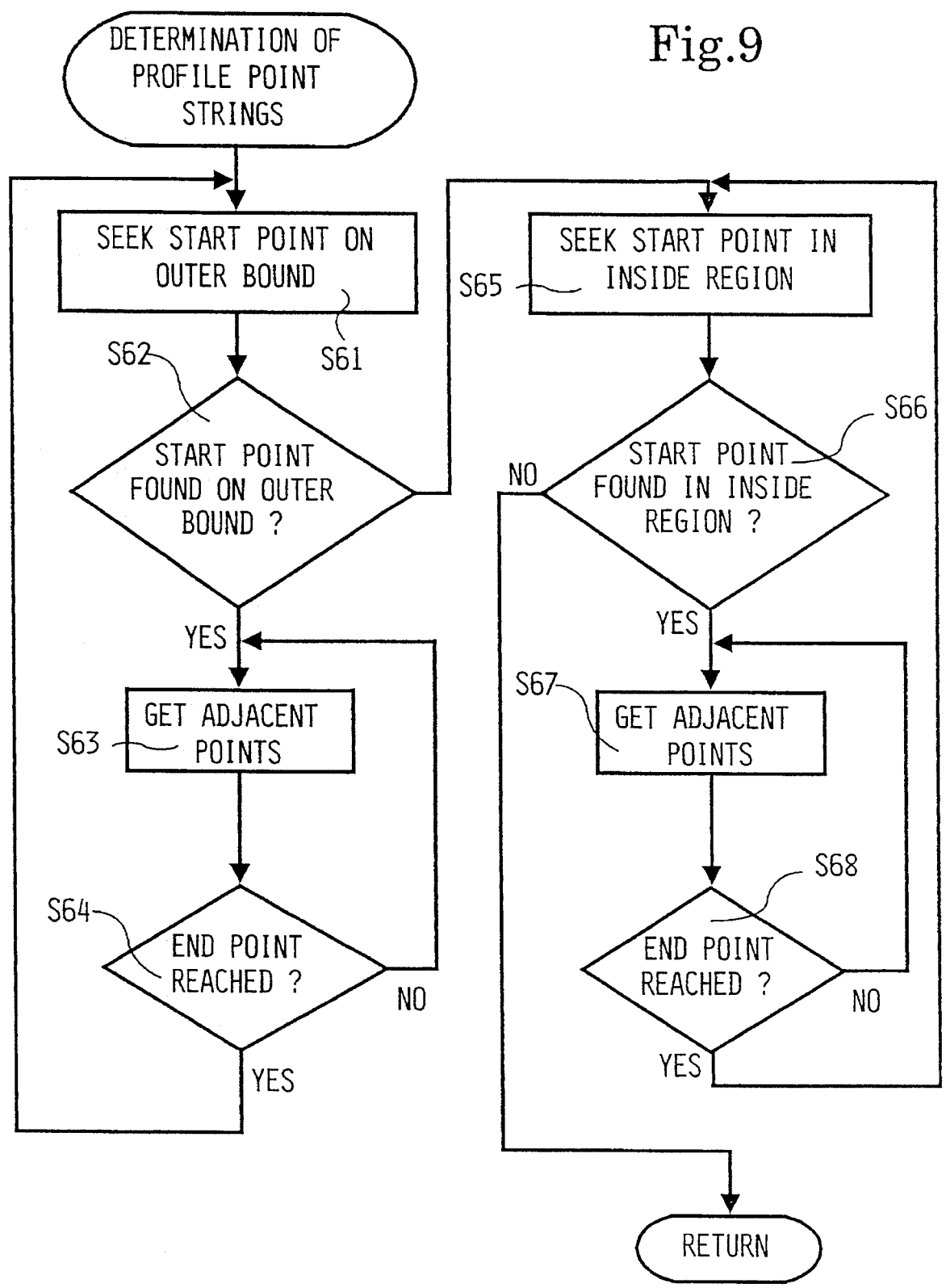
FIG. 9 is a flowchart of the procedure for determining a string of profile points.
Figure 18:
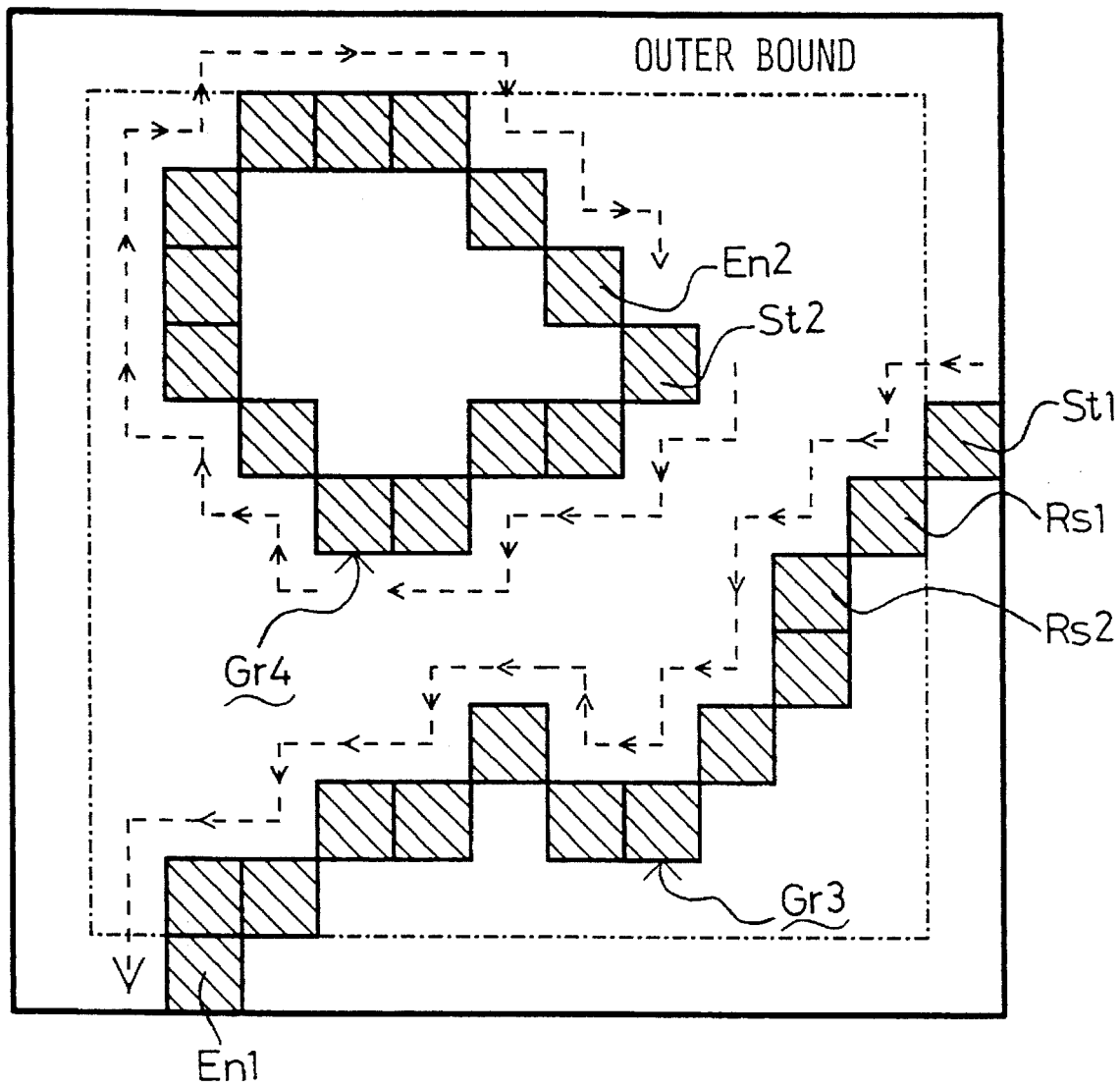
FIG. 18 is a model of the method for determining a string of profile points.

Next, the profile point string determination process (step S22 in FIG. 7) will be explained in detail with reference to the flowchart of FIG. 9 and the diagram of FIG. 18. The profile points obtained through the process shown in FIG. 8 are classified into groups of profile point strings, and the order of profile points in each profile point string is determined. Initially, a profile point located on the outer boundary of the image portion is sought (step S61). If such a profile point is found (yes in step S62), it is selected as the start point St1 for the current profile point string. Next, another point contiguous to the start point St1 is sought as an adjacent point Rs1. Another adjacent point Rs2 contiguous to the adjacent point Rs1 is sought (step S63). This process is continued to detect all connected profile points (step S64). When a profile point Rsn which is contiguous only to the former adjacent point Rsn−1 is found, the point Rsn is determined to be an end point En1 (step S64). The string of profile points from the start point St1 to the end point En1 is the current profile point string. The order in which each profile point was detected is defined as the order of the profile point in the profile point string.

Figure 24:
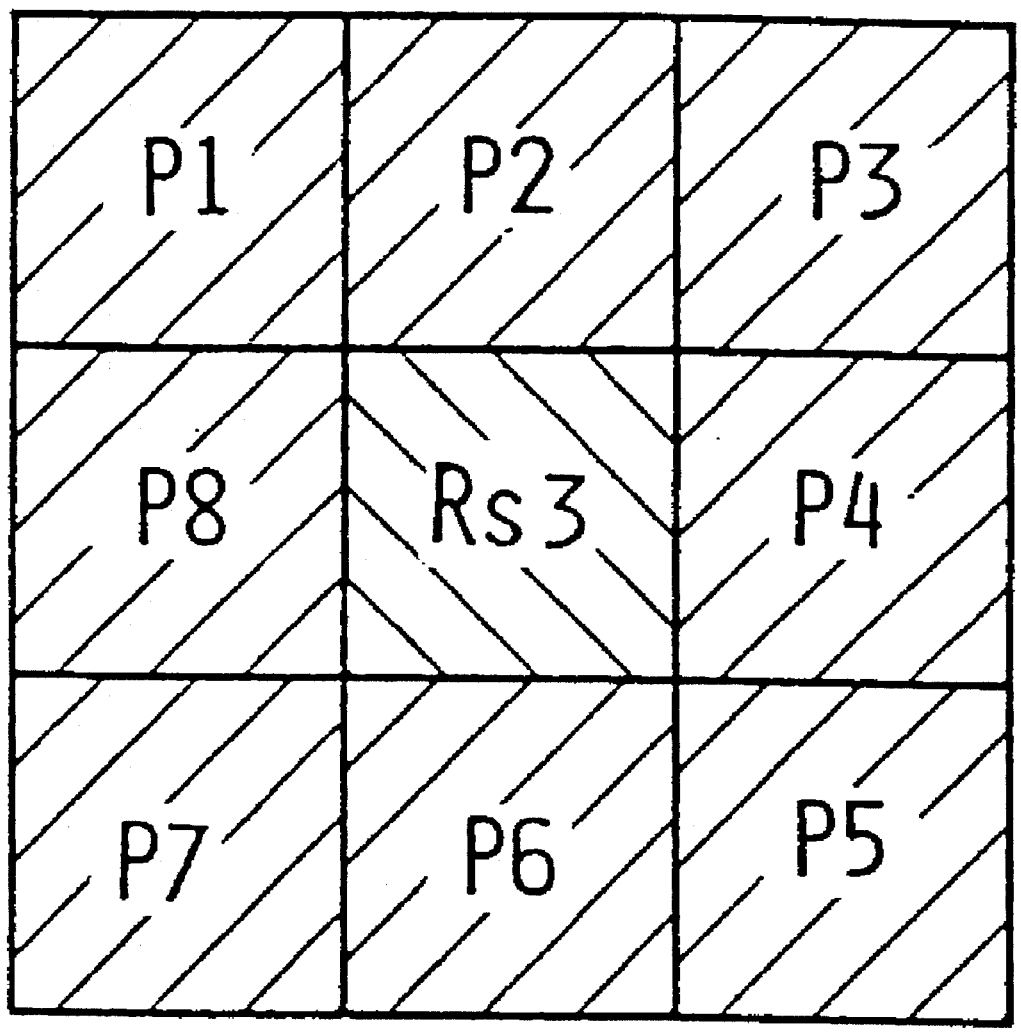
FIG. 24 is a diagram of a profile point and the adjacent points.

The word "contiguous" used in the above explanation includes the horizontal and vertical continuities of two square dots which share a dot border line, and also includes the oblique continuities of two square dots which share a dot corner point. Namely, as shown by FIG. 24, points P1 through P8 are all adjacent points of a central point Rs3.

After detecting the end point En1 (yes in step S64), the determination of one profile point string Gr3 is completed. The control sequence returns to the search for a next start point on the outer bound (step S61). Another start point is sought (step S62), and the same procedure as explained above takes place to determine another profile point string.

If no other unused (i.e. not already part of a profile point string) profile point on the outer boundary of the image portion is found (no in step S62), an unused profile point in the inner region is sought (step S65). If such a point is found (yes in step S66), it is selected as the next start point St2 of the next profile point string. A string of adjacent points is again detected sequentially (step S67). If a newly detected adjacent point Rsm happens to be the start point St2, the immediately preceding profile point is determined to be the end point En2 of the next profile point string (yes in step S68). After detecting the end point En2, the determination of a closed profile point string Gr4 is completed. The control sequence then returns to step S65 search for another unused profile point for the determination of another profile point string. If another unused profile point is found (yes in step S66), the same procedure is explained above takes place from this start point to determine another profile point string existing in the inner region. Again the order in which each profile point was detected is defined as the order of the profile point in the profile point string. If no unused profile point is found (no in step S66), the profile point string determination process stops.

The method for detecting an inflection point (step S23 in FIG. 7) will be explained in detail. If there are n profile points (Rp1, . . , Rpm, . . , Rpn) in an image, a line which connects the points Rpm−4 and Rpm and another line which connects the points Rpm and Rpm+4 make an angle Am. If the angle Am exceeds 180, it is modified to be 360-Am, so that Am takes a value in the range of $0 \leq Am \leq 180$. Similarly, a line which connects the points Rpm−5 and Rpm−1 and another line which connects the points Rpm−1 and Rpm≠make an angle Am−1. Further, a line which connects the points Rpm−3 and Rpm+1 and another line which connects the points Rpm+1 and Rpm+5 make an angle Am+1. The profile point Rpm which meets one of the following conditions is determined to be an inflection point.

Condition 1: Am−1>Am and Am=Am+1

Condition 2: Am−1=Am and Am<Am+1   (1)

Figure 19:
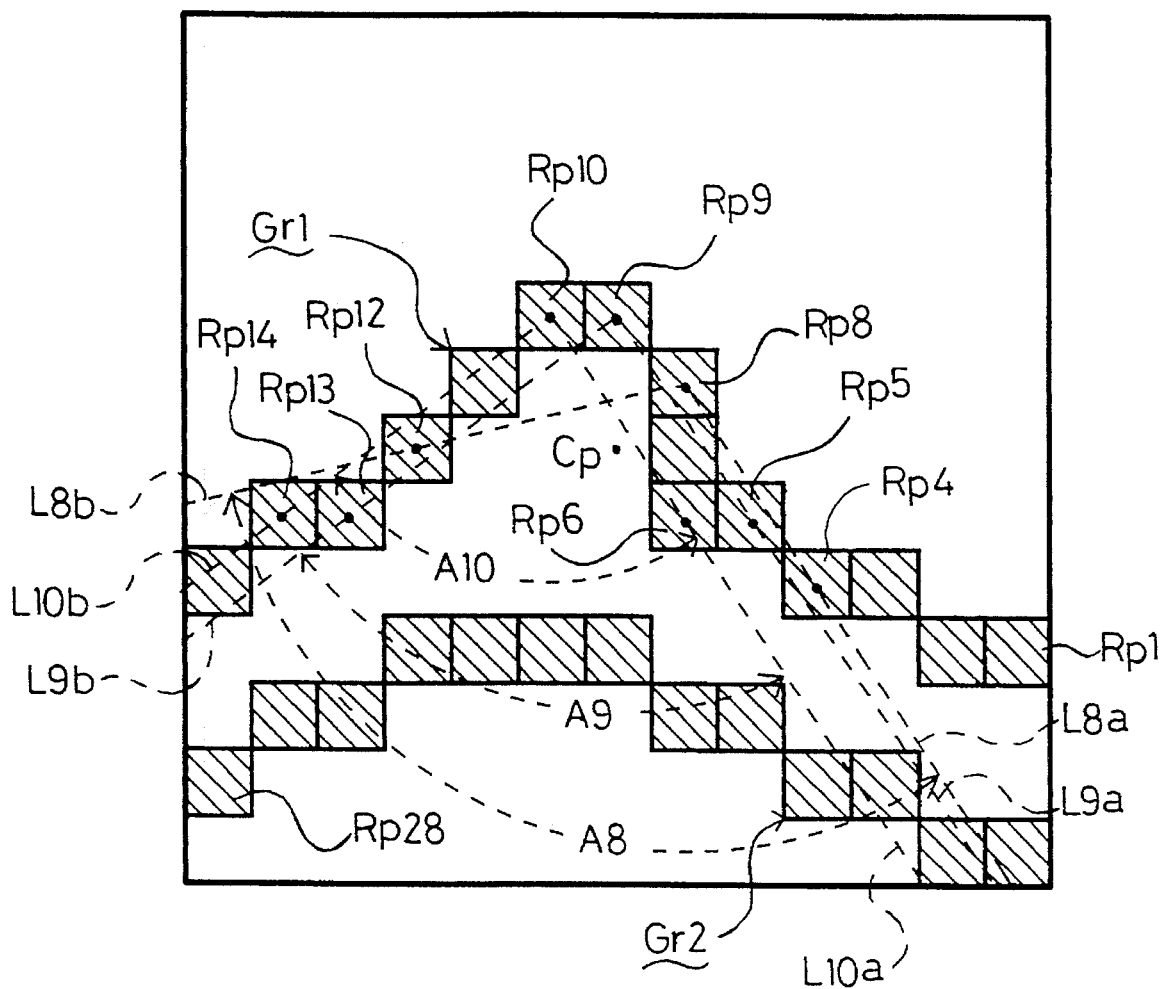
FIG. 19 is a model of the method for detecting an inflection point.

For example, if the point Rpm is the profile point Rp9 in FIG. 19, Rpm−4 is Rp5 and Rpm+4 is Rp13. Accordingly, the angle Am is A9 between the lines L9a and L9b. Similarly, the angle Am−1 is A8 between the lines L8a and L8b, and the angle Am+1 is angle A10 between the lines L10a and L10b. These three angles relate as follows.

A8>A9 and A9=A10   (2)

This relationship of the angles meets Condition 1, and therefore the profile point Rp9 is determined to be an inflection point. The above-mentioned procedure of determining an inflection point is merely an example, and it may be modified depending on the resolution of the image reading device.

Figure 10:
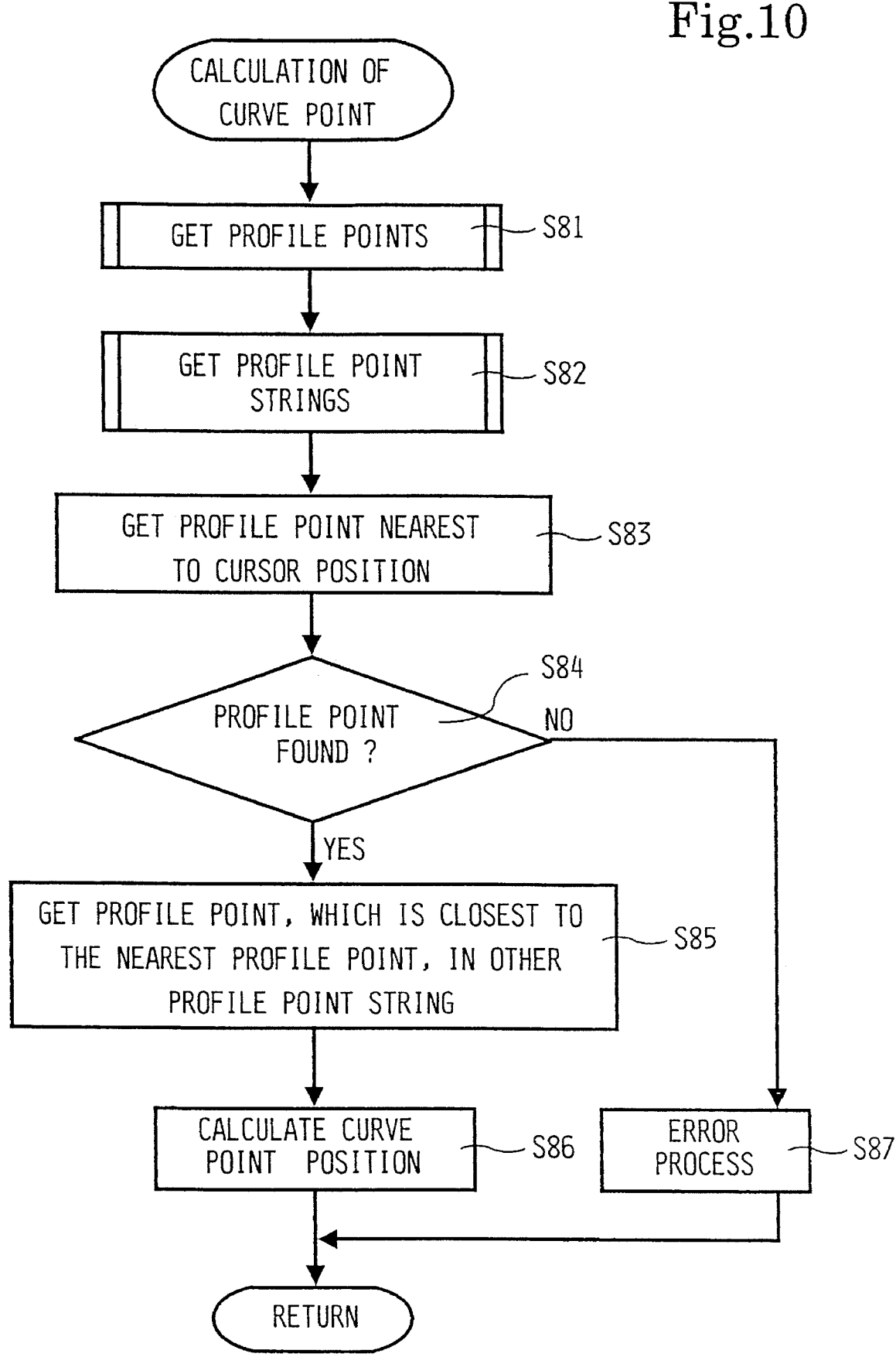
FIG. 10 is a flowchart of the procedure for determining the position of a curve point.
Figure 20:
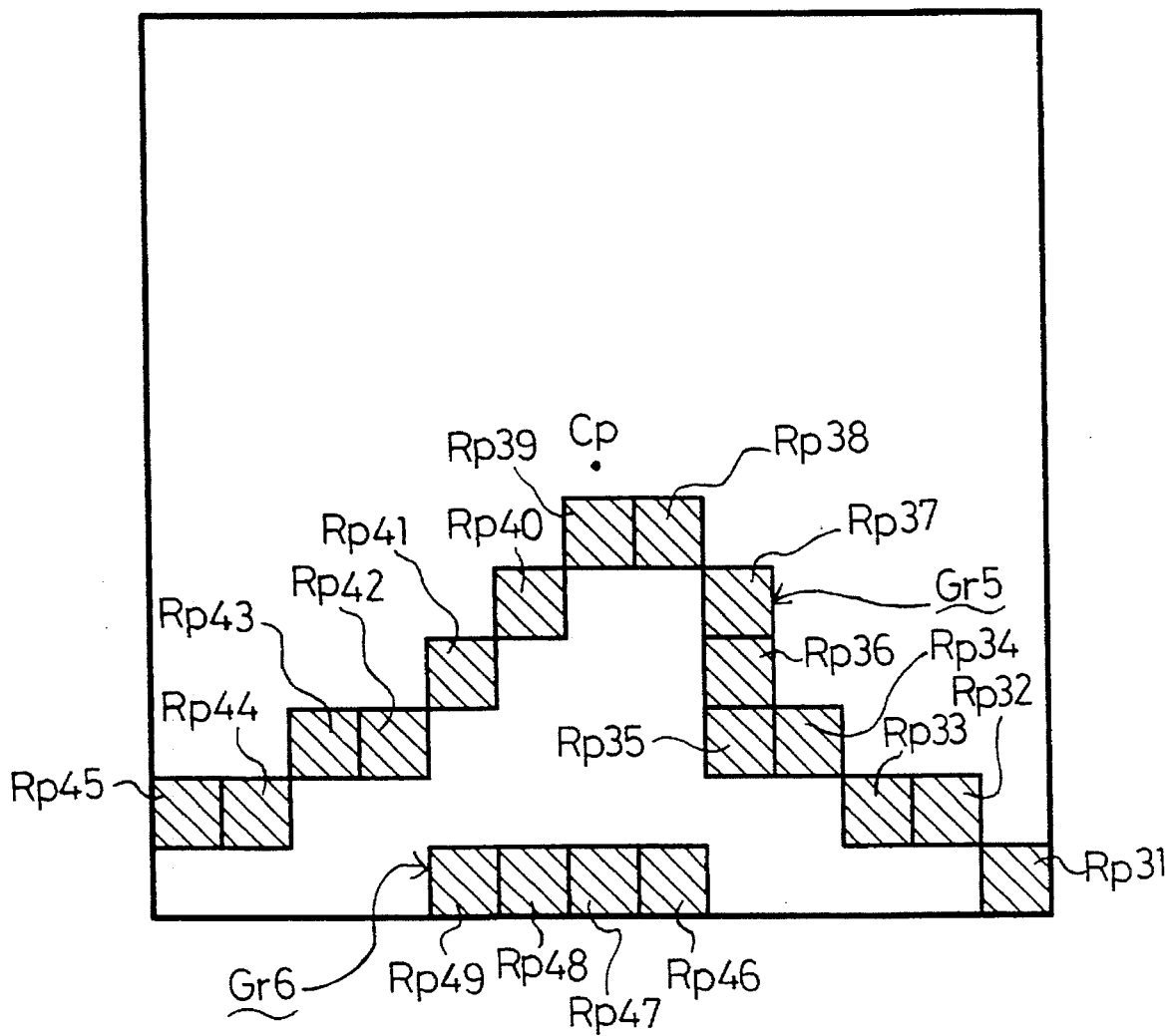
FIG. 20 is a model of an image including a curve point.
Figure 21:
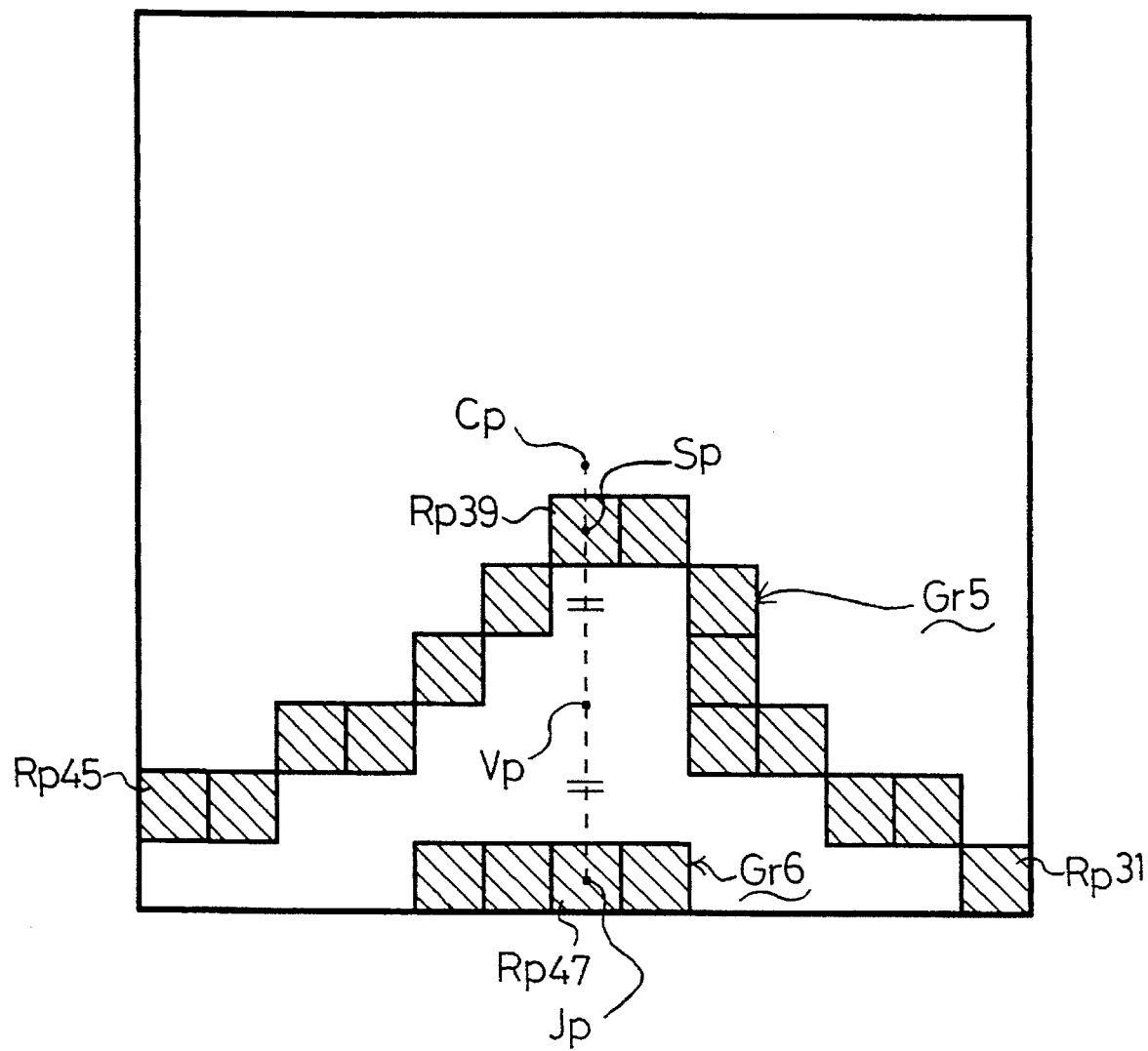
FIG. 21 is a model of the method for determining the position of a curve point.

The curve point determining process (step S12 of FIG. 6) will be explained in detail with reference to the flowchart of FIG. 10 and the diagram of FIGS. 20 and 21. Initially, profile points Rp31 through Rp49 of the original figure are detected in the image information provided by the image information reader 70 as shown in FIG. 20 (step S81). These profile points are classified into groups of profile point strings, and the order of profile points in each of the resulting profile point strings Gr5 and Gr6 is determined (step S82). The processes for detecting the profile points Rp31–Rp49 and determining the profile point strings Gr5 and Gr6 and the order of profile points are identical to those used for determining corner points described above (steps S21 and S22 of FIG. 7) in connection with FIGS. 8 and 9.

Next, a profile point Sp (Rp39 in the present example) nearest to the central point Cp of the image pointed by the cursor 77 is detected from among all profile points included in the profile point strings Gr5 and Gr6 (step S83). If a closest profile point is not found (no in step 84), the control sequence proceeds to the error process (step S87) before returning to the main routine. Next, an auxiliary point Jp is selected as the profile point (Rp47 in the present example) located closest to the nearest profile point Sp. The auxiliary point Jp is detected from among the profile points which are not included in the profile point string which includes the closest point Sp (Gr5 the present example) (step S85). The halfway point of the line section connecting the nearest profile point Sp and the auxiliary point Jp is selected as the position of the curve point V. The relative coordinates of the position of the points in the image are determined. The absolute coordinates of the curve point Vp can readily be determined (step S86) through the coordinate transformation based on the absolute coordinates of the central point Cp of the image on the digitizer, as described above.

Figure 11:
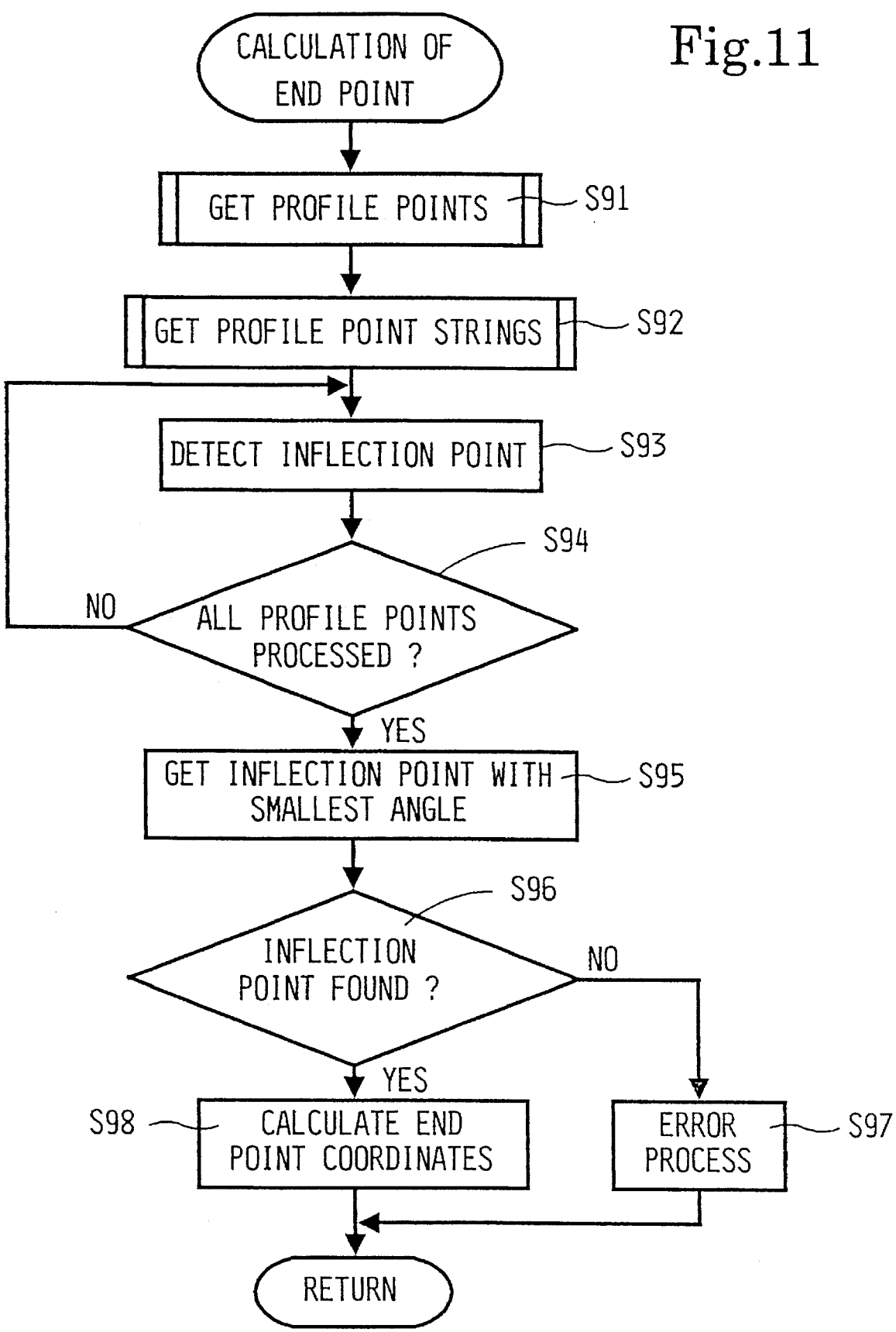
FIG. 11 is a flowchart of the procedure for determining the position of an end point.
Figure 22:
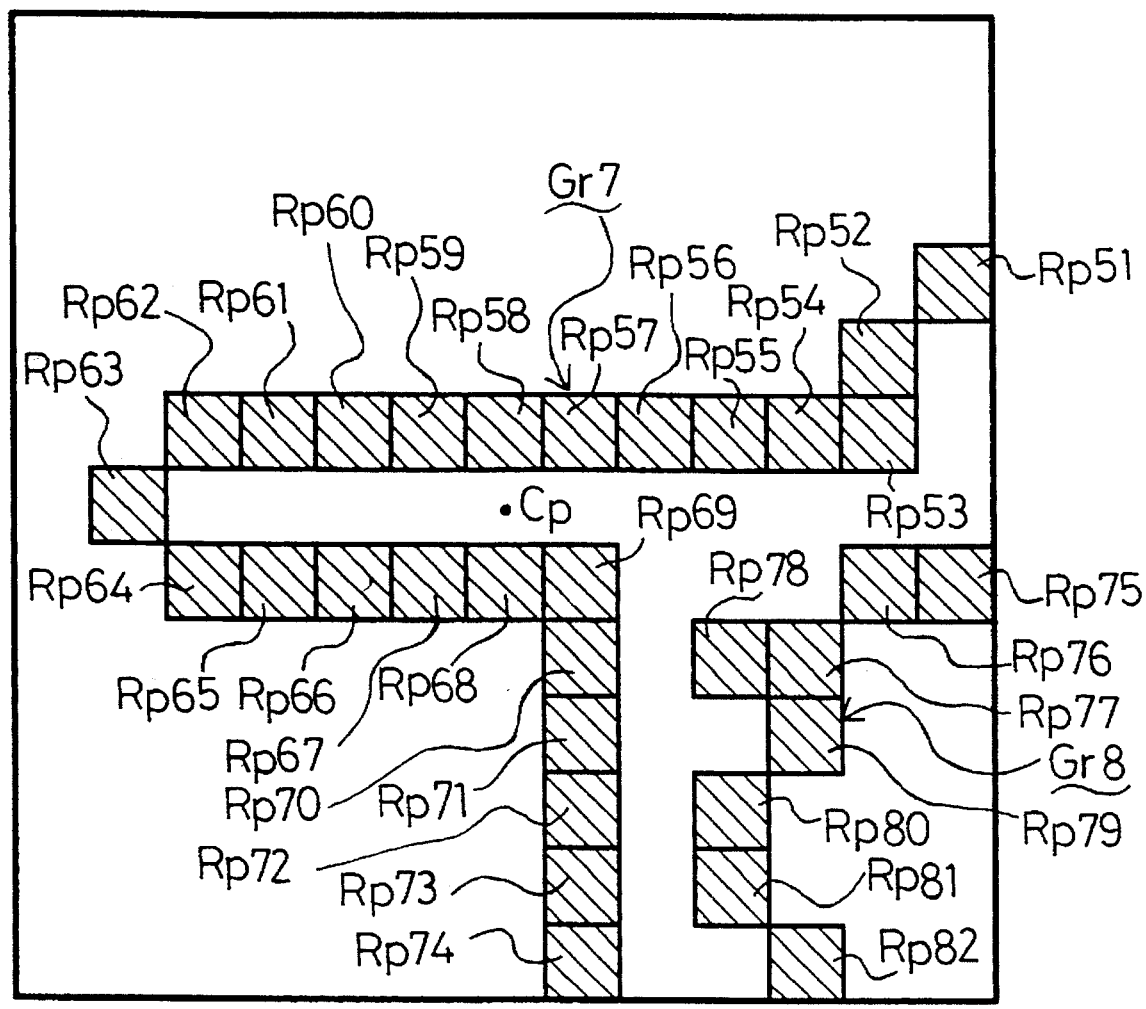
FIG. 22 is a model of an image including an end point.
Figure 23:
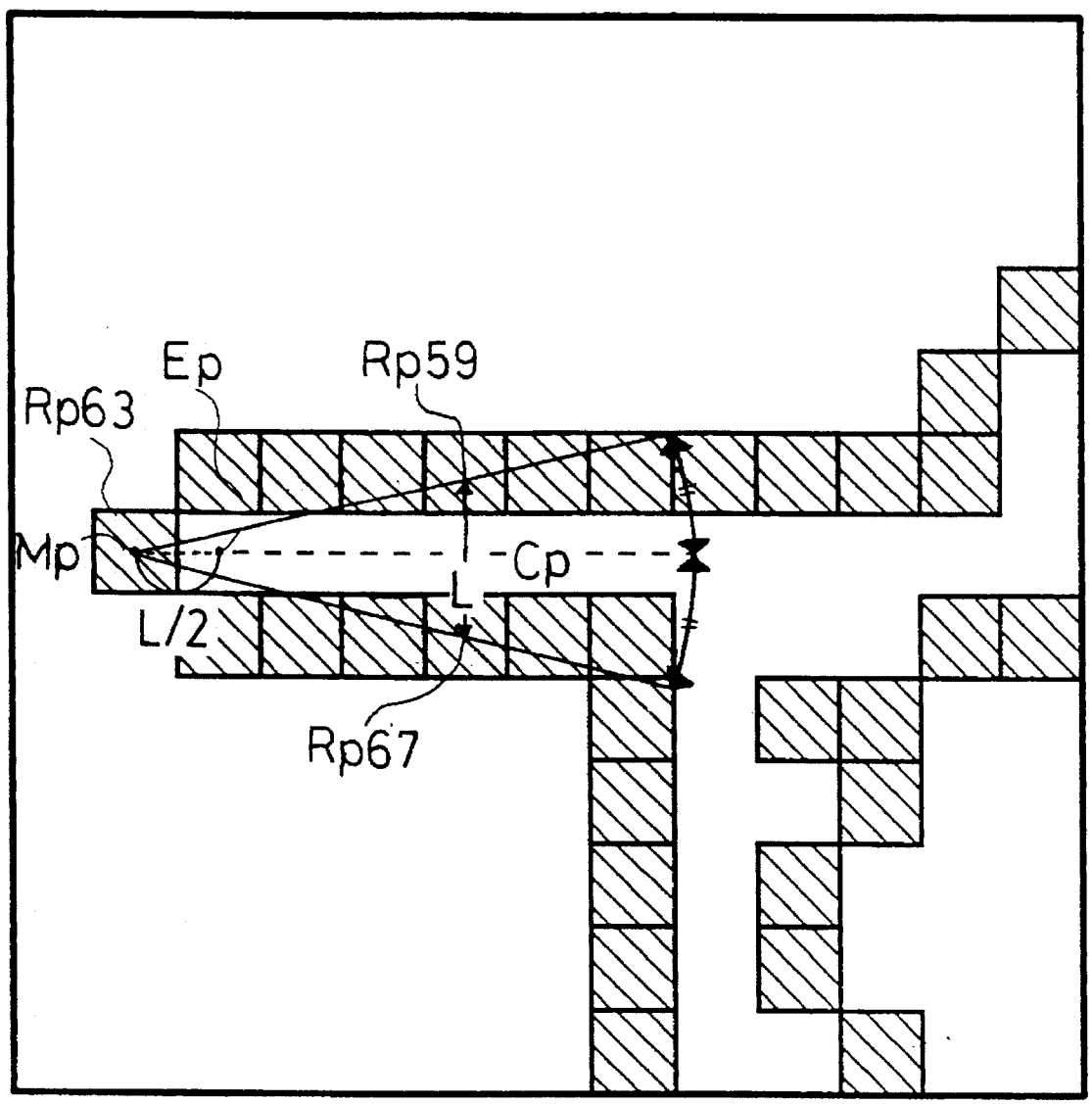
FIG. 23 is a model of the method for determining the position of an end point.

The end point calculation process (step S15 of FIG. 6) will be explained in detail with reference to the flowchart of FIG. 11 and the diagram of FIGS. 22 and 23. Initially, profile points Rp51 through Rp82 of the original figure are detected in the image information provided by the image information reader 70, as shown in FIG. 22 (step S91). These profile points are classified into groups of profile point strings, and the order of profile points in each of the resulting profile point strings Gr7 and Gr8 is determined (step S92). The processes for detecting the profile points Rp51–Rp82 and determining the profile point strings Gr7 and Gr8 and the order of profile points are identical to those used for the calculation of corner point (steps S21 and S22 of FIG. 7) and the calculation of curve point (steps S81 and S82 of FIG. 10) described in connection with FIG. 8 and FIG. 9.

Next, inflection points in the profile point strings Gr7 and Gr8 (step S93) are detected in the same manner as used for the calculation of the corner point position (step S23 of FIG. 7) explained by the diagram of FIG. 19. Each profile point is tested to determine if it is an inflection point. If any profile point has not been tested (no in step S94), the control sequence returns to the detection of inflection point (step S93). After completing the inflection point detection process (yes in step S94), the inflection point with the smallest angle Amin among the detected inflection points is selected as the minimum angle inflection point Mp (step S95). For example, the Mp is Rp63 in FIG. 23. If a relevant inflection point is not found (no in step 96), the control sequence proceeds to the error process (step S97) before returning to the main routine.

After detecting the minimum angle inflection point Mp (yes in step S96), the position of the end point is calculated as follows (step S97). The distance L between the two auxiliary points Rpm–4 and Rpm+4 which are used in determining the inflection point Mp is determined. The point on the bisector of the angle Amin and a distance of L/2 from the inflection point Mp is selected as the end point Ep. In the example of FIG. 23, auxiliary points used to detect the angle A63 corresponding to profile point Rp63 are Rp59 and Rp67. The distance L between these points is determined. The position on the bisector of the angle A63 at a distance of L/2 from the inflection point Rp63 is determined to be the end point Ep. Its coordinates in the image are determined. The absolute coordinates of the end point Ep can readily be determined through the coordinate transformation based on the absolute coordinates of the central point Cp of the image, as described above.

Figures read by the foregoing arrangement and procedures are stored as vector data in the vector data area 82 of the external memory unit 80, and they can be displayed on the display unit 50 or printed on the output unit 60 when necessary. Specifically, when a large-scale xy plotter or the like is employed for the output unit 60, real-size figures can be printed for use as dress patterns.

Although a specific embodiment of invention has been described, the invention is not confined to the foregoing arrangement and processes, but various modifications are possible. For example, a point between two curve points may be determined based on the cubic interpolation instead of the quadratic interpolation so that a smoother curve can be obtained.

Although in the foregoing embodiment characteristic points of a figure are categorized as one of three types, corner points, curve points and end points, the number of types of characteristic points may be increased or decreased depending on the application of the system.

Although the foregoing preferred embodiment of invention is a system for entering dress patterns, the present invention is further applicable extensively to figure digitizing systems used in other fields of industry such as mechanical or architectural drawings and printed circuit design.

According to the figure digitizing system of this invention, when the operator points to a characteristic point of a figure with the cursor, image information at positions near the pointed to position is read, characteristic points of the specified type are detected, and the detected point nearest to the cursor position is automatically selected. The operator merely needs to point to a position near the intended characteristic point and specify the type of point. Thus, the accuracy of digitized position data is stabilized. Consequently, the labor and psychological fatigue of the operator are alleviated, the figure input operation is sped up, and the degree to which the accuracy of the data depends on the degree of the operator's proficiency is reduced. The system configuration does not include a large-scale scanner and is very simple. The system allows a shorter read time since it does not need to read the entire drawing, and uses a RAM memory and external memory unit of small capacities for storing sampled data.

What is claimed is:

1. A figure digitizing system, comprising:

pointing means for specifying an intended characteristic point of a figure, wherein the intended characteristic point is one of at least a corner point, a curve point and an end point;

pointing means position determining means for determining nominal position coordinates of the intended characteristic point;

reading means for reading image information from the figure at a plurality of positions near the intended characteristic point specified by the pointing means;

reading means position determining means for determining relative position coordinates of the plurality of positions of the image information read by the reading means, relative position coordinates being relative to the nominal position coordinates of the intended characteristic point;

characteristic point coordinate determining means for determining actual position coordinates of the intended characteristic point specified by the pointing means based on the relative position coordinates of the plurality of positions of the image information determined by the reading means position determining means and the nominal position coordinates of the intended characteristic point determined by the pointing means position determining means.

2. The figure digitizing system of claim 1, wherein said pointing means comprises a digitizing board and a cursor.

3. The figure digitizing system of claim 2, wherein read means comprises a charge-coupled device.

4. The figure digitizing system of claim 3, wherein said cursor and read means is constructed in a hand-sized integrated package, wherein said package moves on the digitizing board.

5. The figure digitizing system of claim 4, wherein said package further comprises a half mirror, wherein image information pointed to by said cursor is directed to the CCD and is visible to a operator.

6. The figure digitizing system of claim 5, wherein absolute coordinates of a center position of the image information read by said reading means are determined by said reading means position determining means.

7. The figure digitizing system of claim 5, further comprising a display for displaying image information read by said reading means.

8. The figure digitizing system of claim 5, further comprising a printer for printing said figure.

9. The figure digitizing system of claim 5, wherein the characteristic point determined by said characteristic point coordinate determining means is converted to vector data.

10. The figure digitizing system of claim 1, wherein said characteristic point coordinate determining means determines coordinates of a nearest actual characteristic point closest to the intended characteristic point specified by the pointing means.

11. The figure digitizing system of claim 1, wherein said characteristic point coordinate determining means determines the corner point by determining a plurality of profile points, at least one profile point string, an inflection point nearest to the corner point pointed to by said pointing means and corner point coordinates for the corner point.

12. The figure digitizing system of claim 1, wherein said characteristic point coordinate determining means determines the curve point by determining a plurality of profile points, at least one profile point string, a closest one of the plurality of profile points which is closest to the curve point pointed to by said pointing means, an auxiliary profile point and the curve point coordinates for the curve point.

13. The figure digitizing system of claim 1, wherein said characteristic point coordinate determining means determines the end point by determining a plurality of points, at least one point string, at least one inflection point, an angle corresponding to each at least one inflection point and end point coordinates for the end joint, wherein the end point coordinates are determined based on the inflection point having a smallest corresponding angle.

14. A figure digitizing method, comprising:
specifying an intended characteristic point of a figure, wherein the intended characteristic point is one of at least a corner point, a curve point and an end point;
reading image information at a plurality of positions near the intended characteristic point;
determining coordinates of at least one of the plurality of positions of the read image information; and
determining coordinates of the intended characteristic point based on the determined coordinates of the image information.

15. The figure digitizing method of claim 14, wherein the intended characteristic point is the corner point and the intended characteristic point coordinate determining step comprises:
generating a plurality of profile points from the image information read by the reading step;
generating at least one profile point string from the plurality of profile points;
determining a nearest inflection point closest to the corner point;
determining an angle of the nearest inflection point;
determining a bisector of the angle;
determining an auxiliary profile point;
determining a distance between the nearest inflection point and the auxiliary point; and
determining coordinates of the corner point based on the determined distance and the determined bisector.

16. The figure digitizing method of claim 14, wherein the intended characteristic point is the curve point and the intended characteristic point coordinate determining step comprises the steps of:
generating a plurality of profile points from the image information read by the reading step;
generating at least one profile point string from the plurality of profile points;
determining a nearest one of the plurality of profile points which is closest to the corresponding point, the nearest profile point being included in a first one of the at least one profile point string;
determining an auxiliary point closest to the nearest profile point, the auxiliary point not included in the first profile point string;
determining a line section connecting the nearest profile point and the auxiliary point;
determining a length of the line section; and
determining coordinates of the curve point based on the determined line section and the determined length.

17. The figure digitizing method of claim 14, wherein the intended characteristic point is an end point and the intended characteristic point coordinate determining step comprises the steps of:
generating a plurality of profile points from the image information read by the reading step;
generating at least one profile point string from the plurality of profile points;
determining at least one inflection point occurring within the at least one profile point string;
determining an angle corresponding to each at least one inflection point;
determining a smallest corresponding angle;
determining for the inflection point corresponding to the smallest corresponding angle, first and second auxiliary points;
determining a distance between the first and second auxiliary points;
determining a bisector of the smallest corresponding angle; and
determining coordinates for the end point based on the determined bisector and the determined distance.

* * * * *